US006829222B2

(12) United States Patent
Amis et al.

(10) Patent No.: US 6,829,222 B2
(45) Date of Patent: Dec. 7, 2004

(54) CLUSTERHEAD SELECTION IN WIRELESS AD HOC NETWORKS

(75) Inventors: Alan Dewayne Amis, Plano, TX (US); Ravi Prakash, Plano, TX (US)

(73) Assignee: Board of Regents the University of Texas System, Austin, TX (US)

( * ) Notice: Subject to any disclaimer, the term of this patent is extended or adjusted under 35 U.S.C. 154(b) by 792 days.

(21) Appl. No.: 09/841,746

(22) Filed: Apr. 24, 2001

(65) Prior Publication Data

US 2002/0018448 A1 Feb. 14, 2002

Related U.S. Application Data

(60) Provisional application No. 60/199,644, filed on Apr. 25, 2000.

(51) Int. Cl.$^7$ ................................................. H04J 12/28
(52) U.S. Cl. ....................... 370/238; 370/256; 370/400; 455/445; 709/241
(58) Field of Search ................................ 370/242, 221, 370/254, 256, 245, 258, 238, 331, 335, 338, 351, 400, 409, 522, 396, 390, 404; 455/445, 519, 571, 7, 11.1, 13.1; 709/218, 241, 245; 340/825.02

(56) References Cited

U.S. PATENT DOCUMENTS

| | | | | |
|---|---|---|---|---|
| 4,864,559 | A | * 9/1989 | Perlman | 370/256 |
| 5,583,996 | A | * 12/1996 | Tsuchiya | 370/258 |
| 5,659,544 | A | * 8/1997 | La Porta et al. | 370/312 |
| 5,850,592 | A | * 12/1998 | Ramanathan | 455/7 |
| 6,046,978 | A | * 4/2000 | Melnik | 370/221 |
| 6,304,556 | B1 | * 10/2001 | Haas | 370/254 |
| 6,456,599 | B1 | * 9/2002 | Elliott | 370/254 |
| 6,711,409 | B1 | * 3/2004 | Zavgren et al. | 455/445 |

OTHER PUBLICATIONS

D. J. Baker and A. Ephremides, "The Architectural Organization of a Mobile Radio Network via a Distributed Algorithm", *IEEE Transactions on Communications*, vol. COM–29, No. 11, pp. 1694–1701, Nov. 1981.

D. J. Baker, A. Ephremides and J. A. Flynn, "The Design and Simulation of a Mobile Radio Network with Distributed Control", *IEEE Journal on Selected Areas in Commications*, vol. SAC–2, No. 1, pp. 226–237, Jan. 1984.

B. Das and V. Bharghavan, "Routing in Ad–Hoc Networks Using Minimum Connected Dominating Sets", *Proceedings of ICC*, 1997.

A. Ephremides, J. E. Wieselthier and D. J. Baker, "A Design Concept for Reliable Mobile Radio Networks with Frequency Hopping Signaling", *Proceedings of IEEE*, vol. 75, No. 1, pp. 56–73, Jan. 1987.

F. Talucci, M. Gerla and L. Fratta, "MACA–BI (MACA By Invitation): A Receiver Oriented Access Protocol for Wireless Multihop Networks", Technical Report, University of California at Los Angeles.

(List continued on next page.)

*Primary Examiner*—Duc Ho
*Assistant Examiner*—Phuongchau Ba Nguyen
(74) *Attorney, Agent, or Firm*—Jenkens & Gilchrist, P.C.

(57) ABSTRACT

A system and method is disclosed wherein a plurality of nodes within an ad hoc wireless network are able to wirelessly communicate with each other. Each node includes a first data array for storing a node identifier used in selecting a clusterhead and a second data array for storing information relating to the node providing the node identifier for selecting the clusterhead to the node. Control logic of each node is configured according to a heuristic wherein the node initially determines a largest and smallest node identifier for each node. The node selects a clusterhead for the node responsive to the largest node identifier and the smallest node identifier using a set of predefined rules. The nodes within the area are then linked with the selected clusterhead.

26 Claims, 13 Drawing Sheets

OTHER PUBLICATIONS

E. M. Gafni and D. P. Bertsekas, "Distributed Algorithms for Generating Loop–Free Routes in Networks with Frequently Changing Topology", *IEEE Transactions on Communications*, vol. COM–29, No. 1, pp. 11–18, Jan. 1981.

M. Gerla and J. T.–C. Tsai, "Multicluster, Mobile, Multimedia Radio Network", *ACM* Baltzer *Journal of Wireless Networks*, pp. 255–265, Jul., 1995.

L. Kleinrock and J. Silvester, "Spatial Reuse in Multiphop Packet Radio Networks", *Proceedings of the IEEE*, vol. 75, No. 1, pp. 156–167, Jan. 1987.

A. K. Parekh, "Selecting Routers in Ad–Hoc Wireless Networks", *IEEE*, pp 420–424, 1994.

V. D. Park and M. S. Corson, "A Highly Adaptive Distributed Routing Algorithm for Mobile Wireless Networks", *Proceedings of IEEE INFOCOM* Apr. 1997.

C. E. Perkins and P. Bhagwat, "Highly Dynamic Destination–Sequenced Distance–Vector Routing (DSDV) for Mobile Computers", *Proceedings of ACM SIGCOMM Conference on Communication Architectures, Protocols and Applications*, pp. 234–244, Aug. 1994.

A. Tanenbaum, *Computer Networks*, $3^{rd}$ Edition, Prentice Hall, Upper Saddle River, N.J., 1996.

A. Amis, R. Prokash, T. Vuong, and D. T. Huynh, "Max–Min D–Cluster Formation in Wireless Ad Hoc Networks", *Proceedings of IEEE INFOCOM*, pp. 32–41, Mar. 1999.

* cited by examiner

| Node | 10 | 1 | 2 | 7 | 35 | 8 | 23 | 22 | 21 | 65 | 37 | 31 | 19 | 85 | 16 | 100 | 73 | 28 | 41 | 61 | 11 | 48 | 3 | 15 | 38 |
|---|---|---|---|---|---|---|---|---|---|---|---|---|---|---|---|---|---|---|---|---|---|---|---|---|---|
| Max 1 | 35 | 10 | 73 | 73 | 35 | 65 | 35 | 23 | 65 | 85 | 65 | 37 | 85 | 100 | 85 | 100 | 100 | 73 | 61 | 100 | 100 | 85 | 48 | 100 | 61 |
| Max 2 | 35 | 73 | 100 | 100 | 73 | 85 | 65 | 35 | 85 | 100 | 85 | 85 | 100 | 100 | 100 | 100 | 100 | 100 | 100 | 100 | 100 | 100 | 85 | 100 | 100 |
| Max 3 | 73 | 100 | 100 | 100 | 100 | 100 | 85 | 65 | 100 | 100 | 100 | 100 | 100 | 100 | 100 | 100 | 100 | 100 | 100 | 100 | 100 | 100 | 100 | 100 | 100 |
| Min 1 | 73 | 73 | 100 | 100 | 73 | 100 | 65 | 65 | 85 | 100 | 100 | 100 | 100 | 100 | 100 | 100 | 100 | 100 | 100 | 100 | 100 | 100 | 100 | 100 | 100 |
| Min 2 | 73 | 73 | 73 | 73 | 65 | 65 | 65 | 65 | 85 | 85 | 100 | 100 | 100 | 100 | 100 | 100 | 100 | 100 | 100 | 100 | 100 | 100 | 100 | 100 | 100 |
| Min 3 | 65 | 73 | 73 | 65 | 65 | 65 | 65 | 65 | 65 | 65 | 85 | 100 | 85 | 73 | 100 | 73 | 100 | 100 | 100 | 100 | 100 | 100 | 100 | 100 | 100 |
| Result | 73 | 73 | 73 | 73 | 73 | 65 | 65 | 65 | 65 | 65 | 65 | 85 | 100 | 85 | 100 | 100 | 73 | 100 | 100 | 100 | 100 | 100 | 100 | 100 | 100 |

WINNER

| Node | 10 | 1 | 2 | 7 | 35 | 8 | 23 | 22 | 21 | 65 | 37 | 31 | 19 | 85 | 16 | 100 | 73 | 28 | 41 | 61 | 11 | 48 | 3 | 15 | 38 |
|---|---|---|---|---|---|---|---|---|---|---|---|---|---|---|---|---|---|---|---|---|---|---|---|---|---|
| Max 1 | 35 | 73 | 73 | 7 | 73 | 85 | 85 | 35 | 23 | 85 | 65 | 37 | 100 | 85 | 85 | 100 | 73 | 41 | 61 | 61 | 100 | 100 | 100 | 61 | 61 |
| Max 2 | 73 | 73 | 85 | 73 | 85 | 100 | 85 | 85 | 85 | 85 | 100 | 100 | 100 | 100 | 85 | 100 | 85 | 85 | 61 | 85 | 100 | 100 | 100 | 100 | 61 |
| Max 3 | 85 | 85 | 85 | 73 | 85 | 100 | 100 | 85 | 85 | 100 | 100 | 100 | 100 | 100 | 100 | 100 | 85 | 85 | 85 | 100 | 100 | 100 | 100 | 100 | 100 |
| Min 1 | 85 | 73 | 85 | 73 | 85 | 100 | 85 | 85 | 85 | 100 | 100 | 100 | 100 | 100 | 85 | 100 | 85 | 85 | 85 | 85 | 100 | 100 | 100 | 100 | 100 |
| Min 2 | 73 | 73 | 73 | 73 | 85 | 85 | 85 | 85 | 85 | 85 | 85 | 100 | 100 | 100 | 85 | 100 | 73 | 85 | 85 | 85 | 100 | 100 | 100 | 85 | 85 |
| Min 3 | 73 | 73 | 73 | 73 | 73 | 85 | 85 | 85 | 85 | 85 | 85 | 100 | 100 | 85 | 73 | 100 | 73 | 73 | 85 | 85 | 85 | 85 | 100 | 85 | 85 |
| Result | 73 | 73 | 73 | 73 | 73 | 85 | 85 | 85 | 85 | 85 | 100 | 100 | 100 | 85 | 85 | 100 | 73 | 85 | 85 | 85 | 100 | 100 | 100 | 100 | 100 |

WINNER

| Node | 10 | 1 | 2 | 7 | 35 | 8 | 23 | 22 | 21 | 65 | 37 | 31 | 19 | 85 | 16 | 100 | 73 | 28 | 41 | 61 | 11 | 48 | 3 | 15 | 38 |
|---|---|---|---|---|---|---|---|---|---|---|---|---|---|---|---|---|---|---|---|---|---|---|---|---|---|
| Max 1 | 35 | 73 | 73 | 7 | 73 | 85 | 85 | 35 | 23 | 85 | 65 | 37 | 100 | 85 | 85 | 100 | 73 | 41 | 61 | 61 | 100 | 100 | 100 | 61 | 61 |
| Max 2 | 35 | 1 | 16 | 1 | 23 | 48 | 23 | 23 | 23 | 65 | 19 | 19 | 19 | 48 | 16 | 100 | 16 | 16 | 41 | 8 | 11 | 48 | 3 | 11 | 38 |
| Max 3 | 35 | 73 | 2 | 7 | 35 | 8 | 85 | 22 | 21 | 85 | 37 | 31 | 19 | 85 | 85 | 100 | 73 | 28 | 61 | 8 | 11 | 48 | 3 | 15 | 15 |
| Min 1 | 10 | 7 | 2 | 7 | 35 | 48 | 35 | 22 | 21 | 65 | 37 | 31 | 19 | 85 | 73 | 100 | 73 | 28 | 41 | 41 | 11 | 48 | 3 | 15 | 38 |
| Min 2 | 1 | 1 | 1 | 7 | 35 | 16 | 23 | 22 | 21 | 23 | 37 | 31 | 19 | 23 | 16 | 100 | 1 | 28 | 41 | 11 | 48 | 3 | 61 | 61 |
| Min 3 | 10 | 1 | 2 | 7 | 73 | 8 | 23 | 22 | 21 | 65 | 65 | 31 | 19 | 85 | 73 | 100 | 73 | 2 | 41 | 61 | 8 | 85 | 3 | 15 | 38 |
| Result | 73 | 73 | 73 | 73 | 73 | 85 | 85 | 85 | 85 | 85 | 100 | 100 | 100 | 85 | 85 | 100 | 73 | 85 | 85 | 85 | 100 | 100 | 100 | 100 | 100 |

SENDER

| Node | 50 | 43 | 21 | 46 | 100 | 3 | 14 | 11 | 42 | 38 | 6 | 10 | 1 | 2 | 27 | 13 | 8 | 67 | 73 | 31 | 69 | 15 | 25 | 18 | 26 | 24 |
|---|---|---|---|---|---|---|---|---|---|---|---|---|---|---|---|---|---|---|---|---|---|---|---|---|---|---|
| Max 1 | 50 | 50 | 100 | 46 | 100 | 46 | 100 | 100 | 42 | 42 | 10 | 46 | 67 | 73 | 42 | 69 | 69 | 73 | 73 | 73 | 69 | 69 | 73 | 73 | 26 | 26 |
| Max 2 | 50 | 100 | 100 | 100 | 100 | 100 | 100 | 100 | 42 | 69 | 69 | 100 | 100 | 100 | 69 | 73 | 73 | 73 | 73 | 69 | 73 | 73 | 73 | 73 | 26 |
| Max 3 | 100 | 100 | 100 | 100 | 100 | 100 | 100 | 100 | 100 | 42 | 69 | 69 | 100 | 100 | 100 | 73 | 100 | 100 | 100 | 100 | 73 | 73 | 73 | 73 | 73 | 73 |
| Min 1 | 100 | 100 | 100 | 100 | 100 | 100 | 100 | 100 | 100 | 100 | 73 | 73 | 73 | 100 | 100 | 73 | 73 | 73 | 73 | 100 | 73 | 73 | 73 | 73 | 73 | 73 |
| Min 2 | 100 | 100 | 100 | 73 | 100 | 73 | 73 | 100 | 100 | 100 | 73 | 73 | 73 | 100 | 73 | 73 | 73 | 73 | 100 | 73 | 73 | 73 | 73 | 73 | 73 | 73 |
| Min 3 | 100 | 100 | 70 | 73 | 73 | 73 | 73 | 73 | 100 | 100 | 73 | 73 | 73 | 73 | 73 | 73 | 73 | 73 | 73 | 73 | 73 | 73 | 73 | 73 | 73 | 73 |
| Result | 100 | 100 | 100 | 100 | 100 | 100 | 100 | 100 | 100 | 100 | 100 | 100 | 100 | 73 | 100 | 73 | 73 | 73 | 73 | 73 | 73 | 73 | 73 | 73 | 73 | 73 |

WINNER

| Node | 50 | 43 | 21 | 46 | 100 | 3 | 14 | 11 | 42 | 38 | 6 | 10 | 1 | 2 | 27 | 13 | 8 | 67 | 73 | 31 | 69 | 15 | 25 | 18 | 26 | 24 |
|---|---|---|---|---|---|---|---|---|---|---|---|---|---|---|---|---|---|---|---|---|---|---|---|---|---|---|
| Max 1 | 100 | 50 | 46 | 100 | 100 | 21 | 100 | 100 | 42 | 42 | 21 | 21 | 100 | 100 | 42 | 15 | 69 | 73 | 73 | 31 | 69 | 73 | 73 | 67 | 73 | 26 |
| Max 2 | 100 | 100 | 100 | 100 | 100 | 46 | 100 | 100 | 100 | 42 | 46 | 100 | 100 | 100 | 100 | 69 | 100 | 73 | 67 | 73 | 73 | 73 | 73 | 73 | 73 | 73 |
| Max 3 | 100 | 100 | 100 | 100 | 100 | 100 | 100 | 100 | 100 | 100 | 100 | 100 | 100 | 100 | 100 | 100 | 100 | 100 | 73 | 100 | 73 | 100 | 73 | 73 |
| Min 1 | 100 | 100 | 100 | 100 | 100 | 100 | 100 | 100 | 100 | 100 | 100 | 100 | 100 | 100 | 73 | 100 | 73 | 100 | 73 | 73 | 73 | 73 | 73 | 73 |
| Min 2 | 100 | 100 | 100 | 100 | 100 | 100 | 100 | 100 | 100 | 100 | 100 | 100 | 100 | 100 | 73 | 100 | 73 | 73 | 73 | 73 | 73 | 73 | 73 | 73 | 73 |
| Min 3 | 100 | 100 | 100 | 100 | 100 | 100 | 73 | 100 | 100 | 100 | 73 | 73 | 100 | 73 | 73 | 73 | 73 | 73 | 73 | 73 | 73 | 73 | 73 | 73 |
| Result | 100 | 100 | 100 | 100 | 100 | 100 | 100 | 100 | 100 | 100 | 100 | 100 | 100 | 100 | 73 | 73 | 100 | 73 | 73 | 73 | 73 | 73 |

WINNER

| Node | 4 | 15 | 18 | 27 | 81 | 20 | 5 | 33 | 11 | 30 | 65 | 70 | 1 | 40 | 2 | 51 | 34 | 31 | 50 | 35 | 14 | 22 | 90 | 21 | 3 | 19 | 75 | 48 | 76 | 83 |
|---|---|---|---|---|---|---|---|---|---|---|---|---|---|---|---|---|---|---|---|---|---|---|---|---|---|---|---|---|---|---|
| Max 1 | 15 | 18 | 27 | 81 | 81 | 81 | 20 | 33 | 70 | 65 | 70 | 70 | 70 | 40 | 51 | 51 | 34 | 50 | 50 | 50 | 35 | 90 | 90 | 22 | 83 | 75 | 75 | 76 | 76 | 83 |
| Max 2 | 18 | 70 | 81 | 81 | 81 | 81 | 81 | 81 | 70 | 70 | 70 | 70 | 70 | 70 | 51 | 51 | 51 | 50 | 50 | 70 | 90 | 90 | 90 | 90 | 83 | 83 | 75 | 83 | 76 | 83 |
| Max 3 | 70 | 81 | 81 | 81 | 81 | 81 | 81 | 81 | 70 | 70 | 70 | 70 | 70 | 70 | 51 | 51 | 51 | 50 | 90 | 90 | 90 | 90 | 90 | 90 | 83 | 83 | 83 | 83 | 83 | 83 |
| Min 1 | 70 | 70 | 81 | 81 | 81 | 81 | 81 | 81 | 70 | 70 | 70 | 70 | 70 | 70 | 51 | 51 | 51 | 51 | 50 | 50 | 70 | 90 | 90 | 90 | 83 | 83 | 83 | 83 | 83 | 83 |
| Min 2 | 70 | 70 | 70 | 81 | 81 | 81 | 81 | 70 | 70 | 70 | 70 | 70 | 70 | 70 | 51 | 51 | 50 | 50 | 50 | 70 | 70 | 90 | 90 | 90 | 83 | 83 | 83 | 83 | 83 | 83 |
| Min 3 | 70 | 70 | 70 | 70 | 70 | 81 | 81 | 70 | 70 | 70 | 70 | 70 | 70 | 51 | 51 | 50 | 51 | 50 | 50 | 50 | 51 | 51 | 70 | 90 | 83 | 83 | 83 | 83 | 83 | 83 |
| Result | 70 | 70 | 81 | 81 | 81 | 81 | 81 | 70 | 70 | 70 | 70 | 70 | 70 | 70 | 51 | 51 | 51 | 50 | 50 | 70 | 90 | 90 | 90 | 90 | 83 | 83 | 83 | 83 | 83 | 83 |

WINNER

| Node | 4 | 15 | 18 | 27 | 81 | 20 | 5 | 33 | 11 | 30 | 65 | 70 | 1 | 40 | 2 | 51 | 34 | 31 | 50 | 35 | 14 | 22 | 90 | 21 | 3 | 19 | 75 | 48 | 76 | 83 |
|---|---|---|---|---|---|---|---|---|---|---|---|---|---|---|---|---|---|---|---|---|---|---|---|---|---|---|---|---|---|---|
| Max 1 | 33 | 70 | 27 | 33 | 81 | 20 | 81 | 81 | 70 | 30 | 65 | 70 | 90 | 70 | 51 | 51 | 50 | 50 | 51 | 90 | 51 | 90 | 90 | 76 | 83 | 75 | 75 | 83 | 76 | 83 |
| Max 2 | 81 | 81 | 33 | 81 | 81 | 81 | 81 | 81 | 90 | 70 | 90 | 70 | 90 | 90 | 70 | 90 | 51 | 51 | 51 | 90 | 90 | 90 | 90 | 90 | 83 | 83 | 75 | 83 | 83 | 83 |
| Max 3 | 81 | 90 | 81 | 81 | 81 | 81 | 81 | 81 | 90 | 90 | 90 | 90 | 90 | 90 | 90 | 70 | 51 | 90 | 90 | 90 | 90 | 90 | 90 | 90 | 83 | 90 | 83 | 90 | 83 | 83 |
| Min 1 | 81 | 81 | 81 | 81 | 81 | 81 | 81 | 81 | 90 | 90 | 90 | 90 | 70 | 90 | 70 | 51 | 51 | 90 | 90 | 90 | 90 | 90 | 83 | 83 | 83 | 83 | 83 | 83 | 83 | 83 |
| Min 2 | 81 | 81 | 81 | 81 | 81 | 81 | 81 | 81 | 90 | 90 | 81 | 90 | 90 | 70 | 70 | 51 | 51 | 51 | 90 | 90 | 90 | 90 | 83 | 83 | 83 | 83 | 83 | 83 | 83 | 83 |
| Min 3 | 81 | 81 | 81 | 81 | 81 | 81 | 81 | 81 | 81 | 81 | 70 | 70 | 70 | 51 | 51 | 51 | 51 | 51 | 51 | 51 | 51 | 83 | 90 | 83 | 83 | 83 | 83 | 83 | 83 | 83 |
| Result | 81 | 81 | 81 | 81 | 81 | 81 | 81 | 81 | 90 | 90 | 90 | 70 | 90 | 70 | 51 | 51 | 51 | 51 | 51 | 90 | 51 | 90 | 90 | 90 | 83 | 83 | 90 | 83 | 83 | 83 |

WINNER

| Node | 18 | 45 | 55 | 25 | 70 | 73 | 43 | 4 | 69 | 21 | 3 | 17 | 91 | 16 | 66 | 53 | 93 | 83 | 77 | 29 | 30 | 100 | 15 | 6 | 80 | 33 | 63 | 2 |
|---|---|---|---|---|---|---|---|---|---|---|---|---|---|---|---|---|---|---|---|---|---|---|---|---|---|---|---|---|
| Max 1 | 45 | 73 | 70 | 73 | 73 | 73 | 73 | 73 | 69 | 69 | 93 | 91 | 91 | 91 | 77 | 83 | 93 | 93 | 100 | 100 | 100 | 100 | 100 | 100 | 83 | 93 | 80 | 65 |
| Max 2 | 73 | 73 | 73 | 73 | 73 | 73 | 73 | 73 | 93 | 93 | 93 | 91 | 91 | 91 | 93 | 100 | 100 | 93 | 100 | 100 | 100 | 100 | 100 | 100 | 100 | 93 | 93 | 100 |
| Max 3 | 73 | 73 | 73 | 73 | 73 | 73 | 73 | 73 | 93 | 93 | 100 | 91 | 91 | 93 | 100 | 100 | 100 | 100 | 100 | 100 | 100 | 100 | 100 | 100 | 100 | 100 | 95 | 100 | 100 |
| Min 1 | 73 | 73 | 73 | 73 | 73 | 73 | 73 | 73 | 93 | 93 | 91 | 91 | 91 | 93 | 100 | 100 | 100 | 100 | 100 | 100 | 100 | 100 | 100 | 100 | 95 | 95 | 95 | 100 |
| Min 2 | 73 | 73 | 73 | 73 | 73 | 73 | 73 | 73 | 93 | 93 | 91 | 91 | 91 | 91 | 93 | 93 | 93 | 95 | 100 | 100 | 100 | 100 | 100 | 95 | 95 | 95 | 95 | 95 |
| Min 3 | 73 | 73 | 73 | 73 | 73 | 73 | 73 | 73 | 91 | 91 | 91 | 91 | 91 | 91 | 93 | 93 | 93 | 93 | 68 | 68 | 100 | 95 | 95 | 93 | 95 | 95 |
| Result | 73 | 73 | 73 | 73 | 73 | 73 | 73 | 73 | 93 | 93 | 91 | 91 | 91 | 91 | 100 | 100 | 93 | 93 | 100 | 100 | 100 | 100 | 100 | 100 | 93 | 95 | 100 | 100 |

| Node | 1 | 85 | 22 | 14 | 23 | 68 | 60 | 51 | 61 | 11 | 65 | 24 | 27 | 90 | 71 | 5 | 62 | 95 | 13 | 75 | 35 | 26 | 12 | 67 | 81 | 28 | 19 | 20 | 50 |
|---|---|---|---|---|---|---|---|---|---|---|---|---|---|---|---|---|---|---|---|---|---|---|---|---|---|---|---|---|---|
| Max 1 | 100 | 100 | 85 | 85 | 68 | 68 | 68 | 60 | 61 | 61 | 95 | 95 | 90 | 90 | 90 | 71 | 71 | 95 | 95 | 95 | 67 | 35 | 67 | 81 | 81 | 81 | 50 | 20 | 50 |
| Max 2 | 100 | 100 | 100 | 100 | 100 | 68 | 68 | 68 | 61 | 100 | 95 | 95 | 90 | 90 | 90 | 90 | 95 | 95 | 95 | 95 | 80 | 81 | 95 | 95 | 81 | 81 | 50 | 50 |
| Max 3 | 100 | 100 | 100 | 100 | 100 | 100 | 100 | 68 | 100 | 68 | 100 | 100 | 95 | 95 | 90 | 90 | 90 | 100 | 100 | 95 | 95 | 95 | 95 | 95 | 95 | 95 | 81 | 81 | 50 |
| Min 1 | 100 | 100 | 100 | 100 | 100 | 100 | 68 | 68 | 68 | 68 | 100 | 95 | 95 | 90 | 90 | 90 | 90 | 95 | 95 | 95 | 95 | 95 | 95 | 95 | 95 | 81 | 81 | 81 | 81 |
| Min 2 | 100 | 100 | 100 | 95 | 68 | 68 | 68 | 68 | 68 | 95 | 95 | 90 | 90 | 90 | 90 | 95 | 95 | 95 | 95 | 95 | 81 | 81 | 81 | 81 | 81 | 81 | 81 |
| Min 3 | 95 | 95 | 68 | 95 | 68 | 68 | 68 | 68 | 68 | 95 | 90 | 90 | 90 | 90 | 90 | 90 | 95 | 81 | 81 | 81 | 81 | 81 | 81 | 81 | 81 | 81 | 81 |
| Result | 100 | 100 | 100 | 100 | 68 | 68 | 68 | 68 | 68 | 68 | 95 | 95 | 90 | 90 | 90 | 90 | 90 | 95 | 95 | 95 | 95 | 95 | 81 | 81 | 81 | 81 | 81 | 81 | 81 |

WINNER

| Node | 18 | 45 | 55 | 25 | 70 | 73 | 43 | 4 | 69 | 21 | 3 | 17 | 91 | 16 | 66 | 53 | 93 | 83 | 77 | 29 | 30 | 100 | 15 | 6 | 80 | 33 | 63 | 2 |
|---|---|---|---|---|---|---|---|---|---|---|---|---|---|---|---|---|---|---|---|---|---|---|---|---|---|---|---|---|
| Max 1 | 43 | 70 | 55 | 70 | 73 | 73 | 73 | 73 | 73 | 43 | 91 | 91 | 91 | 91 | 83 | 83 | 93 | 93 | 93 | 68 | 100 | 100 | 100 | 80 | 80 | 93 | 80 | 95 |
| Max 2 | 73 | 73 | 70 | 73 | 73 | 73 | 73 | 73 | 73 | 91 | 91 | 91 | 93 | 100 | 93 | 93 | 100 | 100 | 100 | 100 | 100 | 100 | 93 | 93 | 95 | 100 |
| Max 3 | 91 | 73 | 73 | 73 | 73 | 73 | 73 | 91 | 93 | 73 | 91 | 93 | 93 | 93 | 93 | 100 | 100 | 93 | 100 | 100 | 100 | 100 | 100 | 100 | 100 | 100 | 100 | 100 |
| Min 1 | 91 | 73 | 73 | 73 | 73 | 73 | 73 | 73 | 73 | 91 | 93 | 93 | 93 | 91 | 93 | 100 | 93 | 93 | 93 | 100 | 100 | 100 | 100 | 100 | 100 | 93 | 95 | 100 |
| Min 2 | 73 | 73 | 73 | 73 | 73 | 73 | 73 | 73 | 73 | 73 | 93 | 93 | 91 | 91 | 93 | 93 | 93 | 93 | 93 | 93 | 100 | 100 | 100 | 93 | 93 | 93 | 81 | 95 |
| Min 3 | 73 | 73 | 73 | 73 | 73 | 73 | 73 | 73 | 73 | 73 | 91 | 91 | 91 | 73 | 91 | 91 | 91 | 91 | 91 | 68 | 68 | 100 | 93 | 93 | 81 | 93 | 81 | 81 |
| Result | 73 | 73 | 73 | 73 | 73 | 73 | 73 | 73 | 73 | 91 | 91 | 91 | 91 | 91 | 93 | 100 | 93 | 93 | 93 | 68 | 100 | 100 | 100 | 100 | 93 | 93 | 95 | 95 |

| Node | 1 | 85 | 22 | 14 | 23 | 68 | 60 | 51 | 61 | 11 | 65 | 24 | 27 | 90 | 71 | 5 | 62 | 95 | 13 | 75 | 35 | 26 | 12 | 67 | 81 | 28 | 19 | 20 | 50 |
|---|---|---|---|---|---|---|---|---|---|---|---|---|---|---|---|---|---|---|---|---|---|---|---|---|---|---|---|---|---|
| Max 1 | 100 | 85 | 100 | 85 | 68 | 68 | 68 | 66 | 68 | 61 | 100 | 95 | 90 | 90 | 90 | 85 | 71 | 95 | 75 | 95 | 80 | 63 | 26 | 81 | 95 | 95 | 81 | 81 | 50 |
| Max 2 | 100 | 100 | 100 | 100 | 100 | 100 | 68 | 91 | 68 | 68 | 100 | 90 | 90 | 90 | 90 | 90 | 95 | 95 | 95 | 100 | 81 | 63 | 95 | 95 | 95 | 95 | 95 | 63 |
| Max 3 | 100 | 100 | 100 | 100 | 100 | 100 | 100 | 100 | 100 | 68 | 100 | 100 | 95 | 95 | 95 | 100 | 90 | 100 | 95 | 95 | 100 | 95 | 81 | 95 | 95 | 95 | 95 | 100 | 81 |
| Min 1 | 100 | 100 | 100 | 100 | 100 | 100 | 100 | 93 | 68 | 68 | 100 | 100 | 90 | 95 | 90 | 90 | 90 | 95 | 95 | 95 | 100 | 81 | 81 | 95 | 95 | 95 | 95 | 95 | 81 |
| Min 2 | 100 | 90 | 100 | 100 | 68 | 68 | 93 | 93 | 68 | 68 | 100 | 95 | 90 | 90 | 90 | 90 | 90 | 95 | 95 | 95 | 93 | 81 | 81 | 95 | 95 | 90 | 81 | 95 | 81 |
| Min 3 | 90 | 90 | 68 | 90 | 68 | 68 | 68 | 93 | 68 | 68 | 93 | 95 | 90 | 90 | 90 | 90 | 90 | 90 | 95 | 90 | 81 | 81 | 81 | 81 | 81 | 90 | 81 | 81 | 81 |
| Result | 100 | 100 | 100 | 100 | 68 | 68 | 68 | 100 | 68 | 68 | 100 | 95 | 90 | 90 | 90 | 90 | 90 | 95 | 95 | 95 | 100 | 81 | 81 | 81 | 81 | 95 | 81 | 81 | 81 |

WINNER

Impact of network density on number of clusterheads.

Impact of network density on clusterhead duration.

Impact of network density on cluster size.

Impact of network density on cluster member duration.

Impact of network density on variance of cluster size.

Impact of network density on cluster member duration variance.

Scatter graph with Load Balancing, Max Min.

Scatter graph with Load Balancing, LCA.

Scatter graph with Load Balancing, LCA2.

Scatter graph with Load Balancing, Degree.

US 6,829,222 B2

CLUSTERHEAD SELECTION IN WIRELESS AD HOC NETWORKS

RELATED APPLICATION (S)

This application claims priority from and incorporates herein by reference the entire disclosure of U.S. Provisional Application Ser. No. 60/199,644, filed Apr. 25, 2000.

TECHNICAL FIELD

The present invention relates to ad hoc networks, and more particularly, to the selection of clusterheads within ad hoc networks.

BACKGROUND OF THE INVENTION

There are two algorithm design approaches for management of ad hoc networks and routing of packets in such networks. The first choice is to have all nodes maintain knowledge of the network and manage themselves. However, it imposes a significant communication responsibility on individual nodes. Also, communication drains the battery limiting the useful life of these nodes. Each node must dynamically maintain routes to the rest of the nodes in the network. With large networks the number of messages needed to maintain routing tables may cause congestion in the network. Ultimately, this traffic may generate significant delays in message propagation from one node to another.

The second approach is to identify a subset of nodes within the network and vest them with the extra responsibility of being a leader (clusterhead) of certain nodes in their proximity. The clusterheads are responsible for managing communication between nodes within their own cluster as well as routing information to clusterheads in other clusters. Typically, wireless backbones connect clusterheads in the network. Past solutions of this kind have created a hierarchy where every node in the network was no more than one-hop, away from a clusterhead. In large networks this approach may generate a large number of clusterheads and eventually lead to the same problem as stated in the first design choice. Therefore, it is desirable to have control over the clusterhead density in the network. Networks with many clusterheads and few members somewhat defeats the purpose of having a hierarchical structure. However, too few clusterheads will impose a significant load on the clusterheads.

Furthermore, some of the previous clustering solutions have relied on synchronous clocks for exchange of data between nodes. In the Linked Cluster Algorithm, LCA, nodes communicate using TDMA frames. Each frame has a slot for each node in the network to communicate without collisions. For every node to have knowledge of all nodes in its neighborhood it requires 2n TDMA time slots, where n is the number of nodes in the network. Each node broadcasts in its time-slot the nodes that it has heard from, where the time-slots are in ascending order of the node ids. A node A becomes a clusterhead if at least one of the following conditions is satisfied:

1. A has the highest identity among all nodes within 1 wireless hop of it, or

2. A does not have the highest identity in its 1-hop neighborhood, but there exists at least one neighboring node B such that A is the highest identity node in B's 1-hop neighborhood.

Later the LCA heuristic was revised to decrease the number of clusterheads produced in the original LCA. In this revised edition of LCA (LCA2) a node is said to be covered if it is in the 1-hop neighborhood of a node that has declared itself to be a clusterhead. Starting from the lowest id node to the highest id node, a node declares itself to be a clusterhead if among the non-covered nodes in its 1-hop neighborhood, it has the lowest id.

The LCA algorithm was developed and intended to be used with small networks of less than 100 nodes. In this case the delay between node transmissions is minimal and may be tolerated. However, as the number of nodes in the network grows larger, LCA will impose greater delays between node transmissions in the TDMA communication scheme and may be unacceptable. Additionally, it has been shown that as communications increase the amount of drift in a synchronous timer also increases, thereby degrading the performance of the overall system or introducing additional delay and overhead.

Other solutions base the election of clusterheads on degree of connectivity, not node id. This approach elects the node with the highest degree of connectivity as a clusterhead. Each node broadcasts the nodes that it can hear, including itself. A node is elected as a clusterhead if it is the highest connected node in all of the uncovered neighboring nodes. In the case of a tie, the lowest or highest id may be used. A node is uncovered if it has not elected a clusterhead yet, otherwise it is covered. A node which has already elected another node as its clusterhead can not also be a clusterhead, As the network topology changes this approach can result in a high turnover of clusterheads. This is because when the highest connectivity node drops even one link due to node movement, it may fail to be re-elected as a clusterhead. This is undesirable due to the high overhead associated with clusterhead change over. Data structures are maintained by the clusterheads for each node in the cluster. As new clusterheads are elected these data structures must be passed from the old clusterhead to the newly elected clusterhead. Re-election of clusterheads could minimize this network traffic and avoid the need to send these data structures. Thus, an improved method for selecting clusterheads which provides better efficiency, stability and fairness is desired.

SUMMARY OF THE INVENTION

The present invention overcomes the foregoing and other problems with a communications network for implementing a method for selecting a clusterhead not greater than d-hops from any node in a cluster within an ad hoc network, wherein d is >1. Each node of the communications network implements a set of rules enabling the selection of a clusterhead for the nodes within a d neighborhood. The rules enable a determination of a largest node identifier and a smallest node identifier. A clusterhead for the d-neighborhood may then be selected for a node responsive to the largest node identifier and smallest node identifier. The nodes are then linked together with the selected clusterhead. The identifiers relating to the above determinations and source nodes of the identifiers are stored within first and second data arrays in each of the nodes.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION

Figure 1:
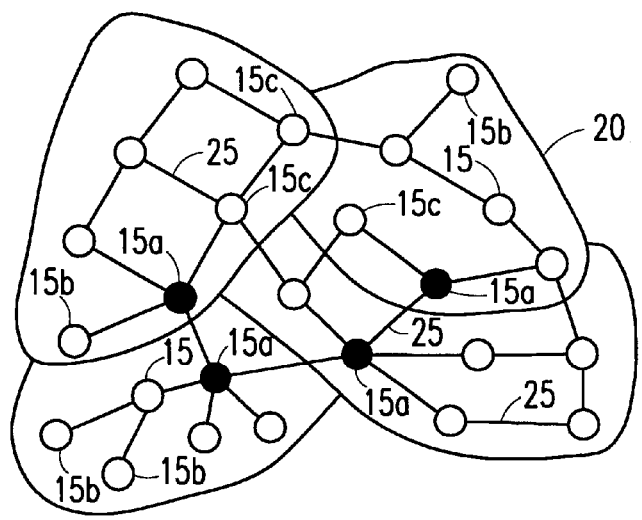
FIG. 1 illustrates an ad hoc network, including a number of nodes grouped into clusters.

Referring now to the drawings, and more particularly to FIG. 1, there is illustrated an example of an ad hoc network 10. Ad hoc networks 10 (also referred to as packet radio networks) consist of nodes 15 that move freely and communicate with other nodes 15 via wireless links 25. One way to support efficient communication between nodes 15 is to develop a wireless backbone architecture. The wireless backbone can be used either to route packets, or to disseminate routing information, or both. While all nodes 15 are identical in their capabilities, certain nodes 15 are elected to form the backbone. These nodes 15 are called clusterheads 15a and gateways 15b. Clusterheads 15a are nodes 15 that are vested with the responsibility of routing messages for all the nodes 15 within their cluster 20. Gateway nodes 15b are nodes 15 at the fringe of a cluster 20 and typically communicate with gateway nodes 15b of other clusters 20.

Due to the mobility of nodes 15 in an ad hoc network 10, the backbone must be continuously reconstructed in a timely fashion, as the nodes 15 move away from their associated clusterheads 15a. The election of clusterheads 15a has been a topic of many papers. In all of these papers the leader election guarantees that no node 15 will be more than 1 wireless hop away from a leader. Furthermore, their time complexity is 0(n), where n is the number of nodes 15 in the network 10. The present system started with the aim of generalizing the clustering algorithms so that a node 15 is either a clusterhead 15a or at most d hops away from a clusterhead 15a.

A new distributed leader election heuristic is proposed for ad hoc networks 10, guaranteeing that no node 15 is more than d wireless hops away from a clusterhead 15a, where d is a value selected for the heuristic. Thus, this heuristic extends the notion of cluster 20 formation. Existing 1-hop clusters are an instance of the generic d-hop clusters. Additionally, the heuristic elects clusterheads in such a manner as to favor their re-election in future rounds, thereby reducing transition overheads when old clusterheads give way to new clusterheads. A clusterhead aging scheme enhances the heuristic to provide load-balancing among clusterheads 15a to insure a fair distribution of load among clusterheads 15a. This allows a large number of nodes 15 to equally share the responsibility of acting as clusterheads 15a. Furthermore, this heuristic has time complexity of O(d) rounds which compares favorably to O(n) for earlier algorithms in large networks. This reduction in time complexity is obtained by increasing the concurrency in communication.

As mentioned previously, the proposed heuristic forms a backbone network between clusterheads 15a. The backbone network allows clusterheads 15a to distribute topology changes to other clusterheads in the network as they occur. Nodes 15 wishing to pass messages to other nodes 15 may solicit routing information from their clusterhead 15a or pass the message to their clusterhead 15a for routing. Upon receiving a message, a clusterhead 15a will distribute it to the appropriate node 15 within its cluster 20, or route the message to the appropriate clusterhead 15a. The backbone network may or may not be used for routing purposes. In low load conditions the backbone could be used for routing. However, the distribution of routing information is the primary purpose of the backbone network and should not be compromised with the overhead of routing data.

Spatial TDMA communication schemes may also be used in conjunction with the proposed heuristic. Once the heuristic has determined a set of clusters 20 and associated clusterheads 15a spatial TDMA may be employed within existing clusters 20 to provide contention free highly concurrent communication. Some TDMA communication schemes such as the ones mentioned are not suitable for large networks. However, if the size of the resulting clusters 20 are small enough the overhead associated with the TDMA frame will be minimal. This scheme will be suitable until there are significant topology changes in the network. At that point the heuristic would need to be run once more to resolve the newly formed clusters.

System Model

In an ad hoc network all nodes 10 are alike and all are mobile. There are no base stations to coordinate the activities of subsets of nodes 15. Therefore, all the nodes 15 have to collectively make decisions. All communication are over wireless links. A wireless link 25 can be established between a pair of nodes 15 only if they are within wireless range of each other. Two nodes 15 that have a wireless link 25 will, henceforth, be said to be one wireless hop away from each other. They are also said to be immediate neighbors. Communication between nodes 15 is over a single shared channel. The Multiple Access with Collision Avoidance (MACA) protocol may be used to allow asynchronous communication while avoiding collisions and retransmissions over a single wireless channel. MACA utilizes a Request To Send/Clear To Send (RTS/CTS) handshaking to avoid collision between nodes 15.

A modified MACA protocol, MACA-BI (By Invitation) [5], suppresses all RTS (Request to Send) and relies solely on CTS (Clear to Send), invitations to transmit data. Simulation experiments show MACA-BI to be superior to MACA and CSMA in multi-hop networks. Other protocols such as spatial TDMA may be used to provide MAC layer communication. Spatial TDMA provides deterministic performance that is good if the number of nodes 15 is kept relatively small. However, spatial TDMA requires that all nodes 15 be know and in a fixed location to operate. In an ad hoc network 10 the nodes 15 within each neighborhood are not known a priori. Therefore, spatial TDMA is not a viable solution initially. It is suggested that MACA-BI be used initially for this heuristic to establish clusterheads 15a and their associated neighborhoods. Then the individual cluster 20 may transition to spatial TDMA for inter-cluster and intra-cluster communication.

This heuristic only considers bidirectional links. All nodes 15 broadcast their node identity (beacons) periodically to maintain neighborhood integrity. After the absence of some number of successive beacons from a neighboring node 15 it is concluded that the node 15 is no longer a neighbor. Due to mobility, a node's neighborhood changes with time. As the mobility of nodes 15 may not be predictable, changes in network topology over time are arbitrary. However, nodes 15 may not be aware of changes in their neighborhood. Therefore, clusters 20 and clusterheads 15a must be updated frequently to maintain accurate network topology.

Definition 1 (d-neighborhood)—The d-neighborhood of a node is the set of all nodes are within d hops of the node. This includes the node itself. Thus, the 0-neighborhood is only the node itself.

Definition 2 (Cluster)—A cluster is a set of nodes that are logically grouped together. No node in a cluster will be more than d wireless hops away from its clusterhead.

Definition 3 (Clusterhead)—A clusterhead is a node within a cluster that is responsible for routing of packets to other clusters. All nodes in a cluster will be within the d-neighborhood of the clusterhead, where d is a parameter of the clustering algorithm.

Definition 4 (Gateway)—A gateway is a node within a cluster that has a neighboring node in another cluster.

The heuristic elects multiple leaders in large ad hoc networks 10 of thousands of nodes 15. The cluster definition is to a collection of nodes that are up to d hops from a clusterhead, where $d \geq 1$, i.e., a d-hop dominating set. The heuristic provides a number of advantages including but not limited to:

1. Nodes asynchronously run the heuristic: no need for synchronized clocks,
2. Limit the number of messages sent between nodes to a multiple of d,
3. Minimize the number and size of the data structures required for the heuristic,
4. Minimize the number of clusterheads based on the value of d,
5. Formation of backbone using gateways,
6. Re-elect clusterheads when possible: stability,
7. Distribute responsibility of managing clusters equally among all nodes: fairness.

Due to the large number of nodes 15 involved, it is desirable to let the nodes 15 operate asynchronously. The clock synchronization overhead is avoided providing additional processing savings. Furthermore, the number of messages sent from each node 15 is limited to a multiple of d, the maximum number of hops away from the nearest clusterhead, rather than n, the number of nodes 15 in the network 10. This guarantees a good controlled message complexity for the heuristic. Additionally, because d is an input value to the heuristic, there is control over the number of clusterheads 15a elected or the density of clusterheads 15a in the network 10.

Figure 2:
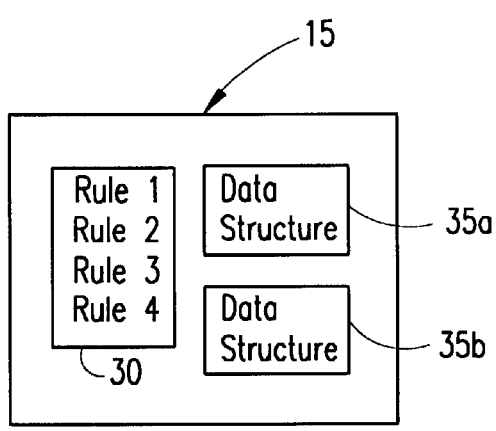
FIG. 2 is a functional block diagram of a node within an ad hoc network.

Referring now also to FIG. 2, the amount of resources needed at each node 15 is minimal, consisting of four simple rules 30 and two data structures 35 that maintain node information over 2d rounds of communication. Nodes 15 are candidates to be clusterheads 15a based on their node id rather than their degree of connectivity. As will be described below, if a node A is the largest (i.e., has the maximum node id) in the d-neighborhood of another node B, then node A will be elected a clusterhead 15a, even though node A may not be the largest in its d-neighborhood. This increases A's probability of continuing to be a clusterhead 15a (stability) rather than an erratic exchange of leadership. Moreover, this helps to minimize the amount of data that must be passed from an outgoing clusterhead 15a to a new one when there is a change over. Finally, load-balancing is needed to insure that all nodes 15 share equally in the responsibility of serving as a clusterhead 15a.

Note, stability and load-balancing are mutually conflicting goals and must be handled in such a manner as to optimize each goal. For example, if the system is too stable, i.e., nodes 15 stay clusterheads 15a for long periods of time, then the nodes' batteries will run down very quickly. On the other hand, if load-balancing is implemented too rigorously clusterheads will be changing roles far too frequently causing a large amount of overhead communication in clusterhead database transmissions.

The objective of the heuristic is to elect clusterheads 15a that are at most d hops from any node 15 in their cluster 20. Therefore, in order to achieve this each node 15 needs to learn about nodes 15 that are at most d hops from them. However, during this process it is not necessary that each node 15 learns about every node that is d hops away, just the ones that are potential clusterheads 15a. The selection criteria for a node 15 becoming a clusterhead 15a are:

1. If a node is the largest node in its d-neighborhood then it should learn of that fact and become a clusterhead, or
2. If a node is the largest node in one of its d-neighbors d-neighborhood, then it should learn of that fact and also become a clusterhead.

Therefore, we want to allow nodes 15 to propagate their identities and claim territory for themselves based on the above criteria. But we also want to be fair and allow all nodes 15 the opportunity to participate.

Insofar as to being fair we want the leadership responsibility distributed as evenly as possible among the elected clusterheads 15a. This requires that a node 15 that is the largest in its d-neighborhood sometimes to relinquish some of its territory to provide a more even distribution of workload.

It is also important that the heuristic spread the responsibility of being a clusterhead 15a to each node 15 in the network 10. No one node 15 should shoulder more responsibility than any other node 15 over a long period of time.

An enhancement to the heuristic is presented for clusterhead 15a aging to help promote the electability of other nodes 15 (load-balancing) that otherwise would not be considered as clusterheads 15a. This is done in a manner not to cause instability in the network 10 but help insure that every node 15 in the network 10 serves as a clusterhead 15 in time.

Furthermore, an approach to asynchronously adapt to changes in the network topology is desired. While the network topology may change in an isolated area, we do not want to run the heuristic on the entire network, just the area affected.

The heuristic runs for 2d rounds of information exchange. Each node maintains two arrays, WINNER and SENDER, corresponding to the data structures 35 of FIG. 2, each of size 2d node ids: one id per round of information exchange.

The WINNER array 35a is the winning node id of a particular round and used to determine the clusterhead 15a for a node 15, as described below.

The SENDER array 35b is the node 15 that sent the winning node id for a particular round and is used to determine the shortest path back to the clusterhead 15a, once the clusterhead 15a is selected.

Initially, each node 15 sets its WINNER to be equal to its own node id. This is followed by the floodmax phase.

Definition 5 (Floodmax)—Each node locally broadcasts its WINNER value to all its 1-hop neighbors. After all neighboring nodes have been heard from, for a single round, the node chooses the largest among its own WINNER value and the values received in the round as its new WINNER. This process continues for d rounds.

Definition 6 (Floodmin)—Same as floodmax except a node chooses the smallest (minimum node id) rather than the largest value as its new WINNER from the remaining node ids from floodmax.

Definition 7 (Overtake)—Overtaking is the act of a new value, different from the node's own id, being selected based on the outcome of the message reception.

Definition 8 (Node Duplicate)—A node duplicate is a single node id that occurs at least once as a WINNER in both the $1^{st}$ d rounds of flooding (floodmax) and $2^{nd}$ d rounds of flooding (floodmin) for an individual node.

Figure 3:
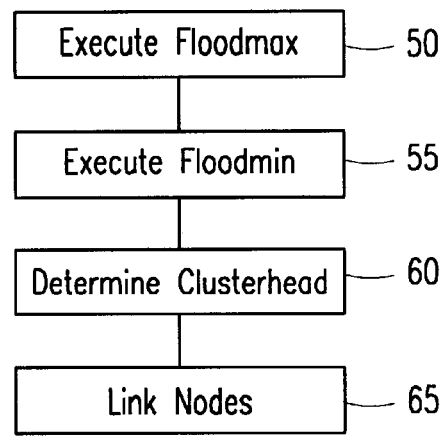
FIG. 3 is a flow diagram illustrating the method for selecting clusterheads within a group of nodes in an ad hoc network.

The heuristic has four logical stages which are more fully described below and in FIG. 3:
1. The propagation of larger node ids via floodmax,
2. The propagation of smaller node ids via floodmin,
3. The determination of clusterheads and,
4. The linking of clusters.

Initially every node uses a flooding algorithm described above. We simulate rounds of the flooding algorithm by having every node send and receive the equivalent of a synchronous round of messages. This is accomplished by requiring each node to send a round r message tagged with r as the round number. After a node has received round r messages from all its neighbors it may proceed with round r transition and ultimately to round r+1.

The first stage uses d rounds of floodmax at 50 to propagate the largest node id in each node's d-neighborhood. At the conclusion of the floodmax, the surviving node ids form the set of potential clusterheads in the network. Nodes record their winning node for each round. Floodmax is a greedy algorithm and may result in an unbalanced loading for the clusterheads.

In fact, there may be cases where clusterhead B is disjoint from its cluster as a result of being overtaken by clusterhead A. Therefore, a node must realize not only if it is the largest in its d-neighborhood but also if it is the largest in any other nodes d-neighborhood. The second stage uses d rounds of floodmin at 55 to propagate the smaller node ids of the existing set of potential clusterheads provided by floodmax. This allows the relatively smaller clusterheads the opportunity to (i) regain nodes within their d-neighborhood, and (ii) realize that they are the largest node in another nodes d-neighborhood. Again each node records the WINNER node for each round in the winner array 35a.

At the conclusion of the floodmin, each node evaluates the round's WINNERs to best determine their clusterhead at 60. In order to accommodate cases where a node's id is overtaken by another node id, the smallest node duplicate is chosen as the clusterhead. The smaller clusterhead is chosen to provide load-balancing. However, in the worst case where larger clusterhead A and clusterhead B are 1-hop away from one another; clusterhead B will record its own node id as a WINNER only in the final round of floodmin. If node B receives its own node id in the floodmin stage, it knows that other nodes have elected it as their clusterhead. Therefore, node B declares itself a clusterhead. Additionally, there may be scenarios where a node is overtaken in the floodmax stage by a set of nodes and then overtaken by a completely different set of nodes in the floodmin stage, none of which is its own node id. In this case the node has no other option but to select a clusterhead that is no more than d hops away. The only known clusterhead within d hops is the WINNER of the final round of the floodmax. The clusterhead selection process will be more fully described in a moment.

Figure 4:
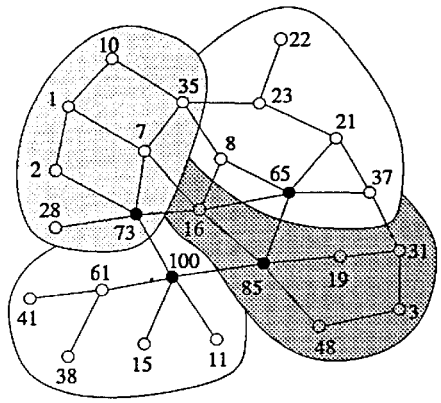
FIG. 4 illustrates a first cluster formation within a network of 25 nodes.

Finally, the gateway nodes (nodes at the periphery of a cluster) begin a convergecast message to link all nodes of the cluster to the clusterhead, and link the clusterhead to other clusters at 65. Each gateway node will include its id and all other gateway nodes of other neighboring clusters in the message. This will establish the backbone of the network. During the convergecast it may be discovered that node(s) belonging to a different cluster reside on the path between a node and its selected clusterhead. FIG. 4 shows the WINNER values selected by the nodes at each round, and the clusters formed when the heuristic terminates. In this example we see that nodes 3, 16, 28, and 48 elected node 100 as their clusterhead. Clusterhead 85 is in the direct convergecast path for nodes 3 and 48 to clusterhead 100. Clusterhead 73 is in the direct convergecast path for node 28 to clusterhead 100. Node 16 must select a convergecast path to clusterhead 100 via clusterhead 73 or 85. In these cases, the cluster closest to the nodes adopt them as members. Therefore, ultimately nodes 3, 16, and 48 become part of the cluster managed by clusterhead 85. Node 28 becomes a member of the cluster managed by clusterhead 73. Note, in this example node 16 could have been absorbed by clusterhead 73 or 85. However, 85 is larger and therefore breaks the tie.

Clusterhead Selection Criteria

Figure 5:
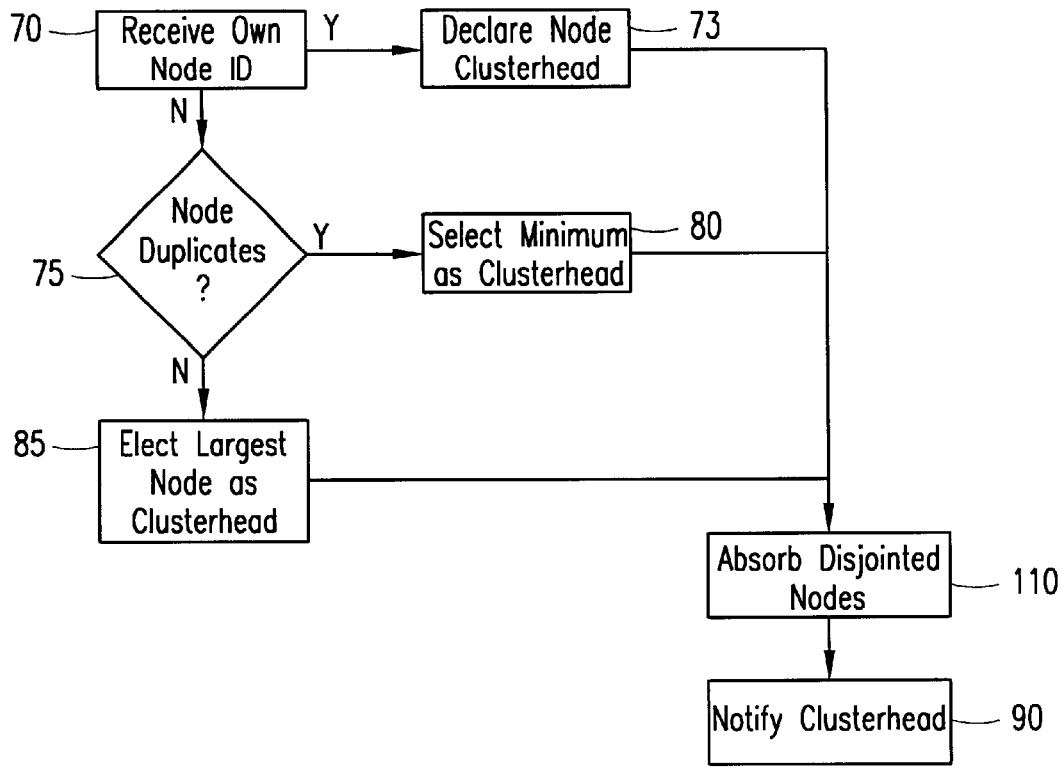
FIG. 5 is a flow diagram further illustrating the method for selecting a clusterhead.

After completion of the flooding rounds 50, 55 described above, the clusterheads are selected for each of the nodes in the network. The following rules described with respect to FIG. 5 explain the logical steps of the heuristic that each node runs on the logged entries in the data structures 35.

Rule 1 First, each node checks to see if it has received its own original node id in the second d rounds of flooding (floodmin) at 70. If it has then it can declare itself a clusterhead at 73 and skip the rest of this phase of the heuristic. Otherwise proceed to Rule 2.

Rule 2 Each node looks at 75 for node duplicates. Once a node has identified all node duplicates, it selects at 80 the smallest node duplicate to be its clusterhead. If a node duplicate does not exist for a node then proceed to Rule 3.

Rule 3 Elect the largest node id in the first d rounds of flooding (floodmax) as the clusterhead for this node at 85.

One more rule exists that handles the situation where a node belonging to a different cluster lies between a node and its elected clusterhead. This will be discussed in a moment.

Gateway Selection and Convergecast

Definition 9 (Fringe Node)—A Fringe Node is one that is (i) n-hops away from its clusterhead; where $n \leq d$, (ii) no neighboring nodes that are n+1-hops away from their elected clusterhead, (iii) no neighboring nodes with a different clusterhead.

After a node has determined its clusterhead based on Rules 1, 2, or 3, it communicates this information to its clusterhead at 90. In order to minimize messages this information is communicated from the fringe nodes and gateway nodes inward to the clusterhead. A node has no direct way to know if it is a fringe node or a gateway node. Therefore, after clusterhead selection each node broadcasts its elected clusterhead to all of its neighbors. Only after hearing from all neighbors can a node determine if it is a fringe node or gateway node at 110. If all neighbors of a node have the same clusterhead selection and all are closer to the clusterhead then this node is a fringe node. If there are neighboring nodes with clusterhead selections that are different, then this node is a gateway node.

Definition 10 (Source Path Node)—A Source Path Node (SPN) is the SENDER of the first occurrence of the elected clusterhead value in the floodmax rounds. In the case of Rule 1 the source path node is the node itself. For Rule 2 the source path node is not determined until the floodmin phase. Finally, for Rule 3 the source path node is the SENDER of the WINNER value in the last round of the floodmax.

Figure 6:
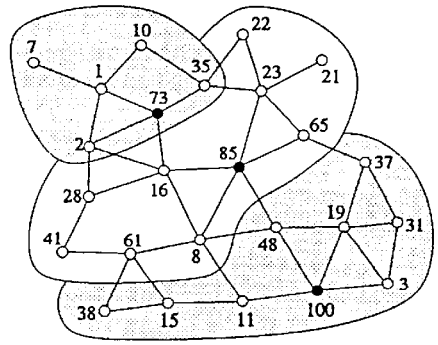
FIG. 6 illustrates a second cluster formation for a network of 25 nodes.

Once a node has identified itself as a fringe node or gateway node it begins a convergecast to the clusterhead node sending its node id, all neighboring gateway nodes and their associated clusterheads. The SENDER data structure 35 (FIG. 2) is used to determine the source path node (SPN) at 115. FIG. 6 shows the resulting network topology after slightly perturbing the network in FIG. 4. Also shown are the WINNER and SENDER data structures 35 FIG. 2 maintained by each node for each round.

We see from the WINNER data structure 35A that node 41 is a fringe node of clusterhead 85. The SPN may be determined for node 41 by determining the round number when node 41's elected clusterhead made its first appearance in the floodmax. Here we see that clusterhead 85 made it first appearance in node 41's WINNER data structure 35a in the last floodmax round, and then cross-reference that round number into the SENDER data structure 35b. Node 41's last floodmax round of the SENDER data structure 35b yields node 61. Therefore, node 61 is node 41's SPN.

The convergecast continues with each node adding its own node id such that when the clusterhead has heard from each of its immediate neighbors it has a database of every node in its cluster. It is not the intent of this heuristic to minimize the number of gateways. Restricting the number of gateways minimizes the number of paths between clusterheads. Rather this heuristic maximizes the number of gateways resulting in a backbone with multiple paths between neighboring clusterheads. This provides fault tolerance, and eases congestion in the backbone network.

Rule 4 There are certain scenarios where a node will elect a clusterhead that is disjoint from the node. That is, another cluster is between the node and its elected clusterhead. In this case, during the convergecast the cluster closest to the node will absorb the node as one of its children at 110. The neighboring node in the newly adopted cluster will immediately send a message to the node identifying its new clusterhead at 90.

FIG. 4 demonstrates the need for Rule 4, as nodes 3, 16, 28, and 48 have elected node 100 as their clusterhead but must pass through nodes 73, and 85 (also clusterheads). On application of Rule 4, clusterhead 85 instructs nodes 3, 16, and 48 to join its cluster. While clusterhead 73 instructs node 28 to join its cluster.

Load-Balancing

A design goal of this heuristic is to promote clusterhead re-election while also allowing all nodes the opportunity to become a clusterhead, thus distributing the load among all nodes over time. For short contiguous periods of time it is desirable to re-elect clusterheads to minimize transmission of clusterhead databases from old clusterheads to newly elected clusterheads. While over the entirety of a much larger time frame, we want each node to share in the responsibility of being a clusterhead. Sharing the responsibility of being a clusterhead may be achieved by setting an upper threshold on a variety of parameters and using a virtual id (VID) for each node. Two of the parameters considered are (i) the number of contiguous time periods for which a node may become a clusterhead, and (ii) the amount of work that a clusterhead performs. We measure the workload of a clusterhead as the summation of the cluster sizes for each time that node has becomes a clusterhead.

Figure 7:
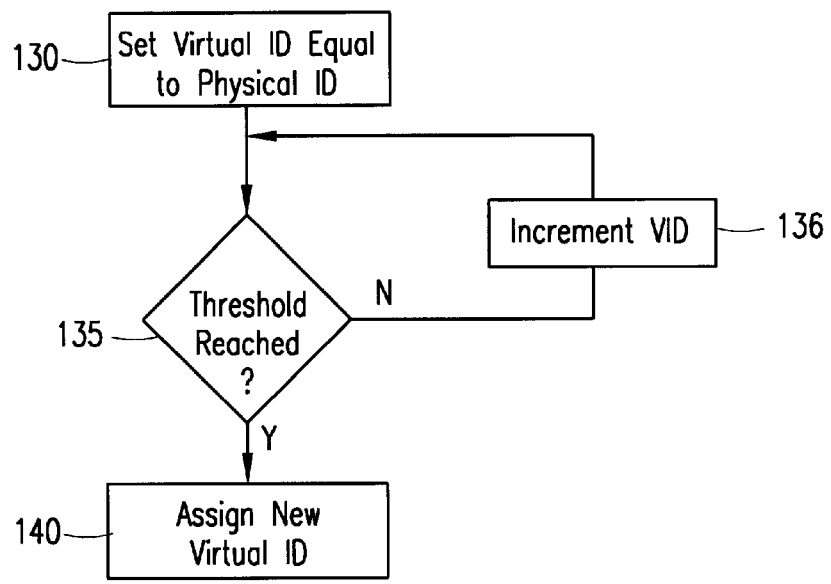
FIG. 7 is a flow diagram illustrating a method for limiting an amount of time a node may serve as a clusterhead.

Referring now to FIG. 7, initially, the virtual id of each node is the same as its physical id at 130. Once the threshold value of either of the parameters mentioned above is reached (or any other desired parameters) at 135 for a given node, a new virtual id is assigned to that node at 140. If the threshold is not reached, the virtual ID is incremented at 136. Any internal variable used to determine that the threshold has been exceeded will also be cleared at this point. This new virtual id will be less than the virtual id of any of the other nodes in the network, thereby reducing the chances of re-election of this node. All ordinary nodes will have an upper bound on their virtual id of MAX_RANGE. Once an ordinary node reaches this value, it is reset to 1 on the next sample period.

The load-balancing can be described with the following logic. Once a node is elected as a clusterhead, it raises its virtual id to MAX_RANGE+VID. This guarantees that there will be no cross section between clusterheads and ordinary nodes. The clusterhead will maintain this value until the specific budget is exceeded, or until it is overtaken by a larger clusterhead. In either case, the clusterhead is made an ordinary node and assigned a VID of 1. Each ordinary node will increment its VID by 1 every sample period. This allows all ordinary nodes to maintain their same relative values with each other while making room for clusterheads once they become ordinary nodes.

Illustrative Examples

A number of examples illustrating the operation of the heuristic are now provided. FIG. 4 shows an example of the network topology generated by the heuristic with 25 nodes. Here we see four clusterheads elected in close proximity of one another. This figure shows how cluster division has the effect of drawing a line between clusterheads and splitting the nodes among themselves. Additionally, FIG. 4 demonstrates the need for Rule 4, as nodes 3, 16, 28, and 48 have elected node 100 as their clusterhead but must pass through nodes 73 and 85, also clusterheads. On application of Rule 4, clusterhead 85 instructs nodes 3, 16, and 48 to join its cluster. Likewise, clusterhead 73 instructs node 28 to join its cluster.

FIG. 6 shows the resulting network topology after slightly perturbing the network in FIG. 4. Here we see that three of the previous four clusterheads are re-elected. The fourth clusterhead, node 65 from FIG. 1, is overtaken by clusterhead 85. The WINNERs data structures 35a (FIG. 2) maintained at the various nodes and the selected leaders for each node are also included to show the progression of the flooding as each node propagates its node id.

Figure 8:
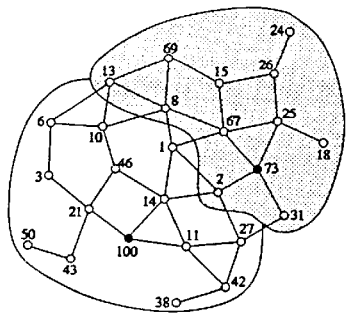
FIG. 8 illustrates a first cluster formation of an ad hoc network including 26 nodes.

FIG. 8 shows an example of the network topology generated by the heuristic with 26 nodes. Two clusterheads are elected, splitting the network among themselves.

Figure 9:
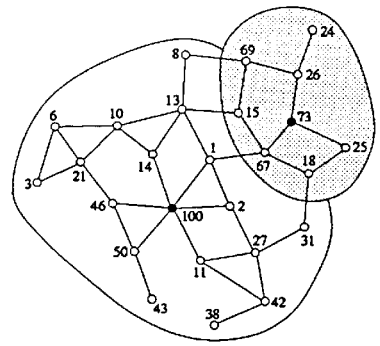
FIG. 9 illustrates a second cluster formation of an ad hoc network including 26 nodes.

FIG. 9 shows the resulting network topology after slightly perturbing the network in FIG. 8. The same two clusterheads are re-elected with only four changes in the clusterhead databases.

Figure 10:
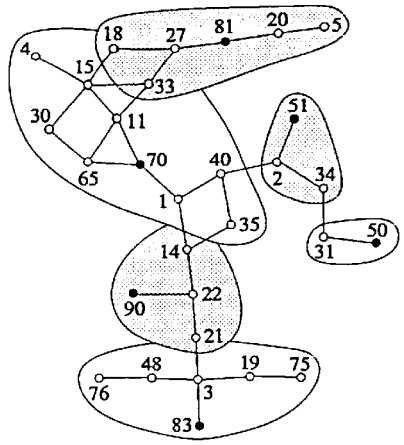
FIG. 10 illustrates a first cluster formation of an ad hoc network including 30 nodes.

FIG. 10 shows an example of the network topology generated by the heuristic with 30 nodes in a more sparse distribution than the previous two networks. Here six clusterheads are elected.

Figure 11:
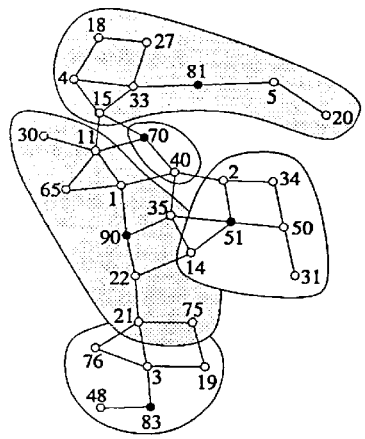
FIG. 11 illustrates a second cluster formation of an ad hoc network including 30 nodes.

FIG. 11 shows the resulting network topology after slightly perturbing the network in FIG. 10. Five of the previous six clusterheads are re-elected. The sixth clusterhead, 50 from FIG. 10, is overtaken and absorbed by clusterhead 51.

Figure 12:
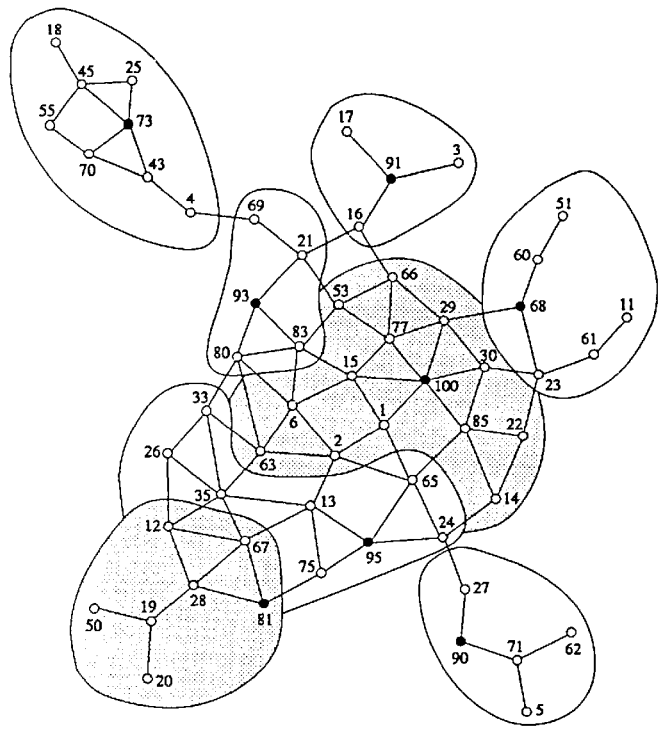
FIG. 12 illustrates a first cluster formation of an ad hoc network including 57 nodes.

FIG. 12 shows an example of the network topology generated by the heuristic with a larger network of 57 nodes. Here the heuristic elects 8 clusterheads.

Figure 13:
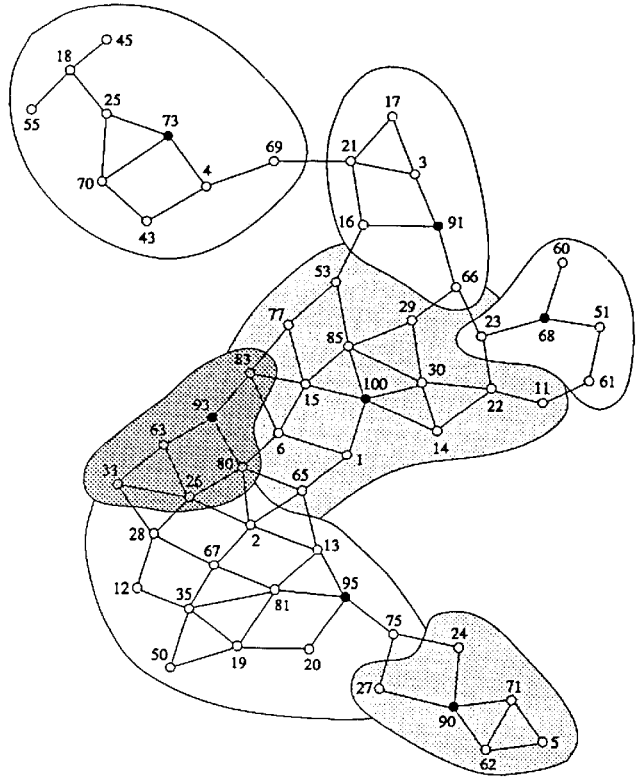
FIG. 13 illustrates a second cluster formation of an ad hoc network including 57 nodes.

FIG. 13 shows the resulting network topology after slightly perturbing the network in FIG. 12. Note that 7 of the previous 8 clusterheads are re-elected. The eighth clusterhead, 81 from FIG. 12, is overtaken and absorbed by clusterhead 95.

Figure 14:
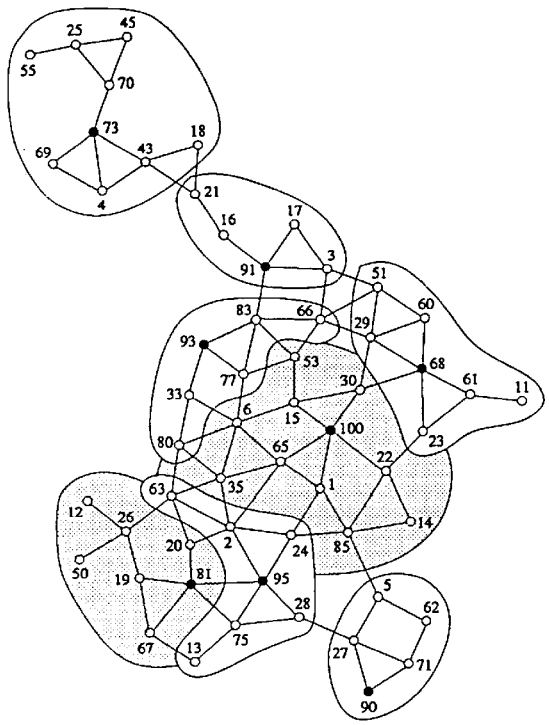
FIG. 14 illustrates a third cluster formation of an ad hoc network including 57 nodes.

FIG. 14 shows the resulting network topology after slightly perturbing the network in FIG. 13. All 7 clusterheads from FIG. 13 are re-elected. Also, the eighth clusterhead from FIG. 12 is re-elected. This helps support the idea that the heuristic re-elects clusterheads when possible. Additionally, FIG. 14 shows the need for Rule 4, as node 51 has elected node 100 as its clusterhead but must pass through node 29, a node belonging to clusterhead 68. On application of Rule 4, node 29 instructs node 51 to join its cluster.

Failure Case

Figure 15:
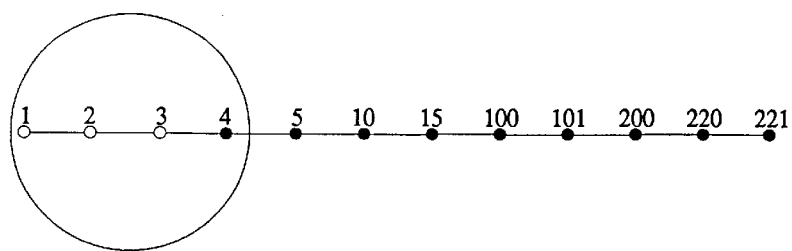
FIG. 15 illustrates a situation wherein the heuristic of the present invention may fail to successfully select a clusterhead.

There is a known configuration where the proposed heuristic fails to provide a good solution. This configuration is when node ids are monotonically increasing or decreasing in a straight line. In this case, the d+1 smallest node ids belong to the same cluster as shown in FIG. 15. All other nodes become clusterheads of themselves only. Again, while this is not optimal it still guarantees that no node is more than d hops from a clusterhead. Furthermore, this configuration is highly unlikely in a real world application.

Time, Message and Storage Complexity

Each node propagates node ids for 2d rounds to elect clusterheads. A convergecast is then initiated to inform the clusterhead of its associated nodes. Since no node is more than d hops from its clusterhead, the convergecast will be O(d) rounds of messages. Therefore, the time complexity of the heuristic is O(2d+d) rounds=O(d) rounds.

The time complexity and the number of transmissions required to achieve a local broadcast (to all neighbors) for a single round is dependent on the success of the data link layer protocol.

Each node has to maintain 2d node ids in its WINNER data structure 35 (FIG. 1), and the same number of node ids in its SENDER data structure 35 (FIG. 1). Thus, the storage complexity is O(d).

Simulation Experiments and Results

Simulation experiments have been conducted to evaluate the performance of the proposed heuristic (with and without load-balancing) and compare these finding against three heuristics, the original Linked Cluster Algorithm (LCA), the revised Linked Cluster Algorithm (LCA2), and the Highest-Connectivity (Degree) heuristic. We assumed a variety of systems running with 100, 200, 400, and 600 nodes to simulate ad hoc networks with varying levels of node density. The entire simulation was conducted in a 200×200 unit region.

Two nodes are said to have a wireless link between them if they are within communication range of each other. The performance was simulated with the communication range of the nodes set to 20, 25 and 30 length units. Additionally, the span of a cluster, i.e., the maximum number of wireless hops between a node and its clusterhead (d) was set to 2 and then 3 for each of the simulation combinations above. Initially, each node was assigned a unique node id and x, y coordinates within the region. The nodes were then allowed to move at random in any direction at a speed not greater than ½ the wireless range of a node per second. To simulate an unbounded region with the chosen node density the simulation region was given the characteristic of a torus. That is, as a node moves beyond the upper vertical limit it will wrap around to the bottom portion of the region. Likewise, as a node moves beyond the right most horizontal limit of the region it will wrap around to the left portion of the region. The simulation ran for 2000 seconds, and the network was sampled every 2 seconds. At each sample time the proposed Max-Min heuristic was run to determine clusterheads and their associated clusters. For every simulation run a number of statistics were measured for the entire 2000 seconds of simulation. Some of the more noteworthy simulation statistics measured were: Number of Clusterheads, Clusterhead Duration, Clusterhead Total Duration, Cluster Size, and Cluster Member Duration. These statistics provided a basis for evaluating the performance of the proposed heuristic.

Definition 1 (Number of Clusterheads)—The mean number of clusterheads in the network. We do not want too few clusterheads, as they will be overloaded with too many cluster members. Nor is it good to have a large number of clusterheads, each managing a very small cluster Definition 2 (Clusterhead Duration)—The mean time for which, once a node is elected as a clusterhead, it stays as a clusterhead This statistic is a measure of stability, the longer the duration the more stable the system.

Definition 3 (Total Clusterhead Duration)—The cumulative time a node is a clusterhead during the entire simulation.

Definition 4 (Cluster Size)—The mean size of a cluster This value is inversely proportional to the Number of Clusterheads. We do not want clusters so large that they will overload their clusterheads, or so small that the clusterheads are idle a good part of the time.

Definition 5 (Cluster Member Duration)—The mean contiguous time a node stays a member of a cluster before moving to another cluster. A cluster is represented by the identity of its clusterhead. Clusterheads are also considered cluster members. This statistic is a measure of stability like the Clusterhead Duration, but from the point of view of nodes that are not clusterheads.

LCA, LCA2, and Degree based heuristics generate I-hop clusters. Therefore, to properly compare these heuristics with the proposed Max-Min heuristic it was necessary to perform a d-closure on the connectivity topology before running each of these heuristics. The d-closure yields a modified graph in which nodes A and B are 1-hop neighbors if they were at most d-hops away in the actual topology graph. Here, d is either 2 or 3. When the LCA, LCA2, and Degree based heuristics are run on this modified graph, they form clusters where each node is at most d wireless hops away from its clusterhead in the original graph. The LCA heuristic elects clusterheads that may be adjacent to one another while the LAC2 and Degree based heuristics do not allow clusterheads to be adjacent to one another. Therefore, the selection of these three heuristics should provide good coverage for benchmarking the performance of the proposed Max-Min heuristic.

Figure 16:
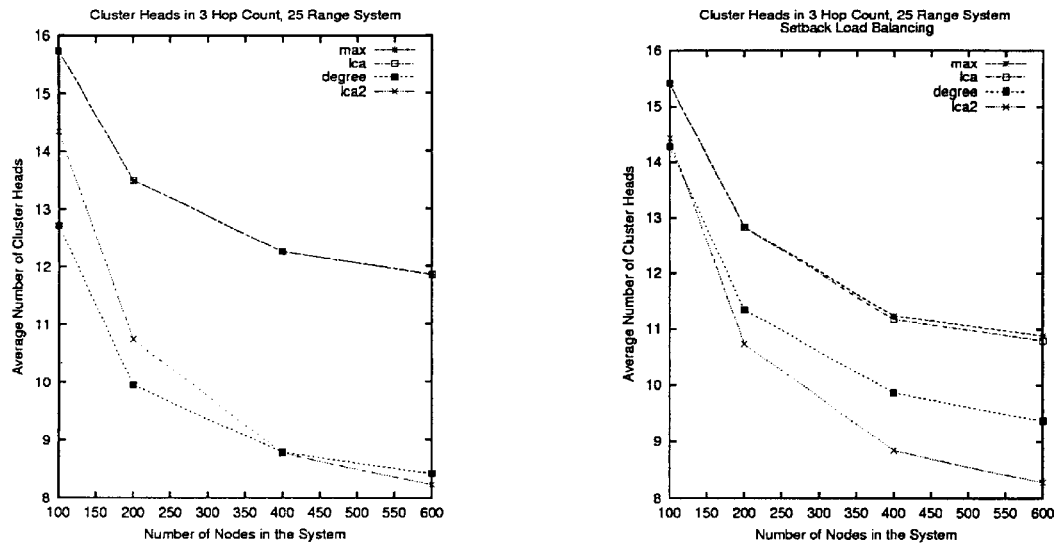
FIG. 16 illustrates the impact of network density on a number of clusterheads within networks.
Figure 18:
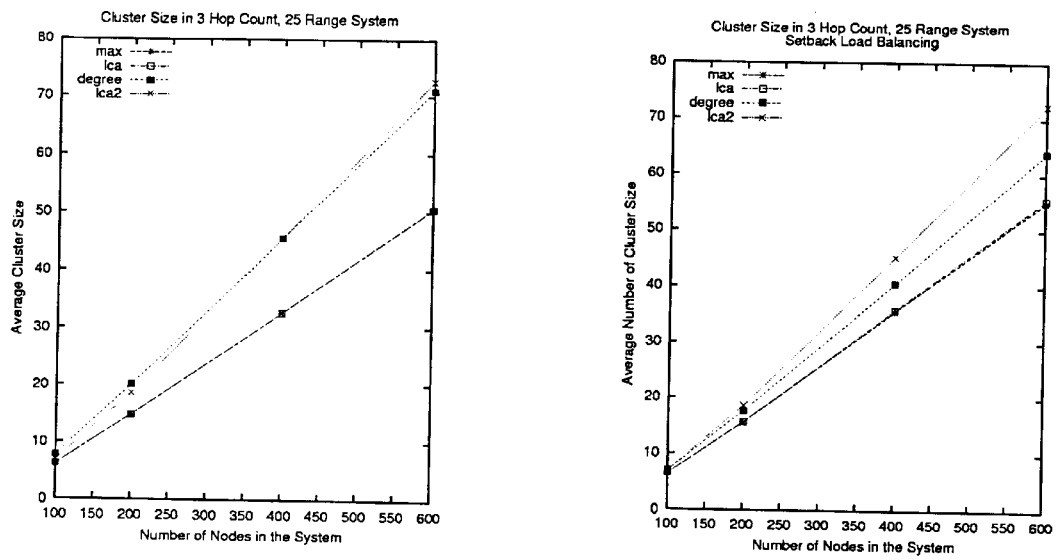
FIG. 18 illustrates the impact of network density on cluster size for networks.

FIG. 16 shows that Max-Min and LCA generate exactly the same number of clusterheads and their plots are superimposed on one another. LAC2 and Degree generate slightly fewer clusterheads than Max-Min or LCA. With fewer clusterheads LAC2 and Degree will have larger clusters, as verified in FIG. 18, and the energy of the clusterheads will be depleted quicker. With load-balancing applied we see that LCA2's behavior has not changed. Max-Min and LCA have only increased the cluster size slightly. Degree has increased its number of clusterheads, helping to distribute less of a load on participating clusterheads, thus decreasing their budget depletion rate.

Figure 17:
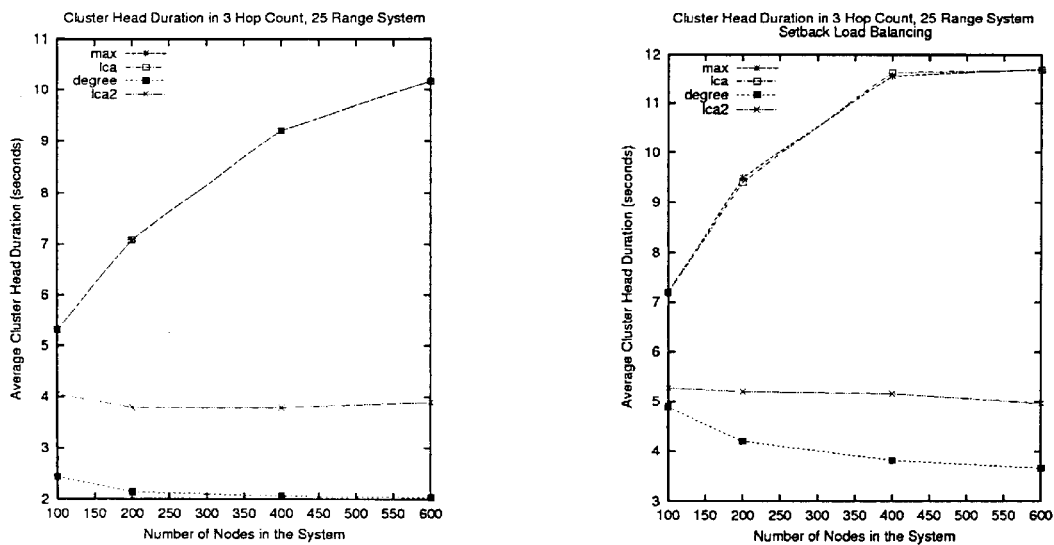
FIG. 17 illustrates the impact of network density on clusterhead durations within networks.

FIG. 17 shows the clusterhead durations of the four heuristics. Again, Max-Min and LCA are superimposed on one another and have the highest clusterhead duration followed by LCA2, and finally the Degree based heuristic. In conjunction with observations from FIGS. 16 and 18, it can be concluded that greater cluster sizes lower the cluster stability. The proposed Max-Min heuristic has the highest stability, along with LCA2. Max-Min and LCA show an increase in clusterhead duration as the network becomes more dense, while LAC2 and Degree show a slight decrease in duration. This is not surprising for Degree: as the network topology changes this approach can result in high turnover of clusterheads. All heuristics have an increase in clusterhead duration with load-balancing applied. Load-balancing induces stability, longer contiguous clusterhead duration, while also placing an upper limit on the contiguous clusterhead duration. The upper bound is a programmable parameter.

Figure 19:
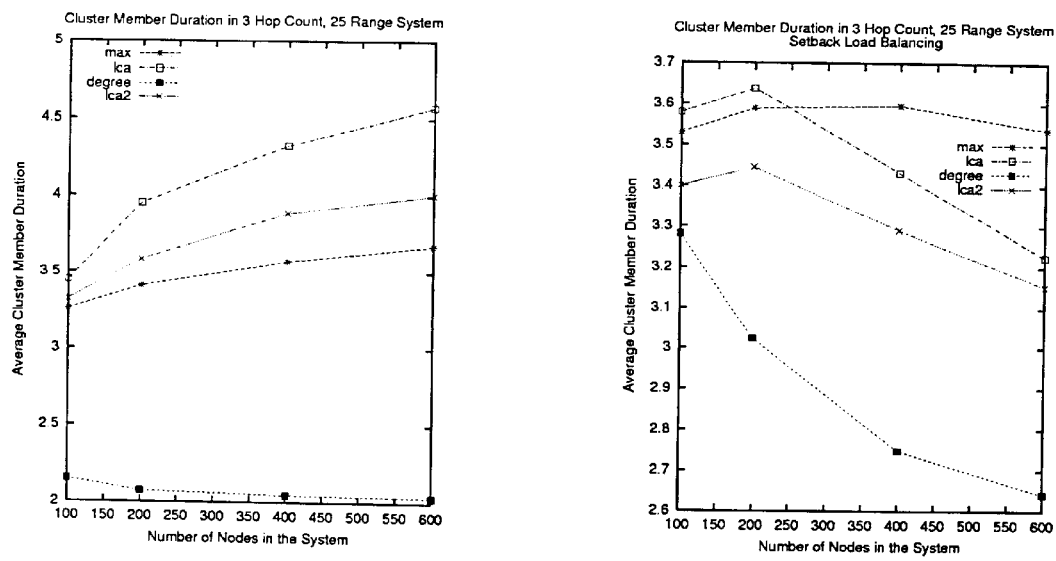
FIG. 19 illustrates the impact of network density on cluster member duration for networks.

FIG. 19 shows LCA with the highest cluster member duration followed closely by LCA2, Max-Min, and finally Degree. With Load-Balancing applied we see LCA and LAC2 show a change from steady increase to decrease in cluster member duration as the network density increases. Max-Min stays fairly constant between 3.5 and 3.6 seconds for all ranges of network density. Degree shows a considerable increase in cluster member duration with load-balancing applied.

Figure 20:
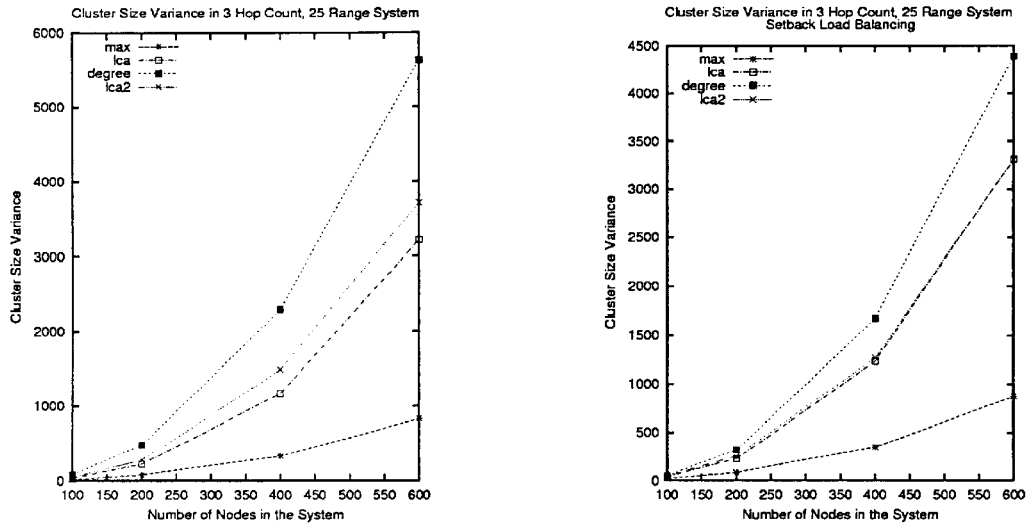
FIG. 20 illustrates impact of network density on variance of cluster size for networks.

All of the simulation data presented up to this point has been based on the statistical mean values. However, one should be aware of the variance of the data as this can provide a clearer representation of the dynamics of the system. FIG. 20 shows that Max-Min produces the smallest variance in the size of the clusters recorded at any network density, with or without load-balancing applied.

Figure 21:
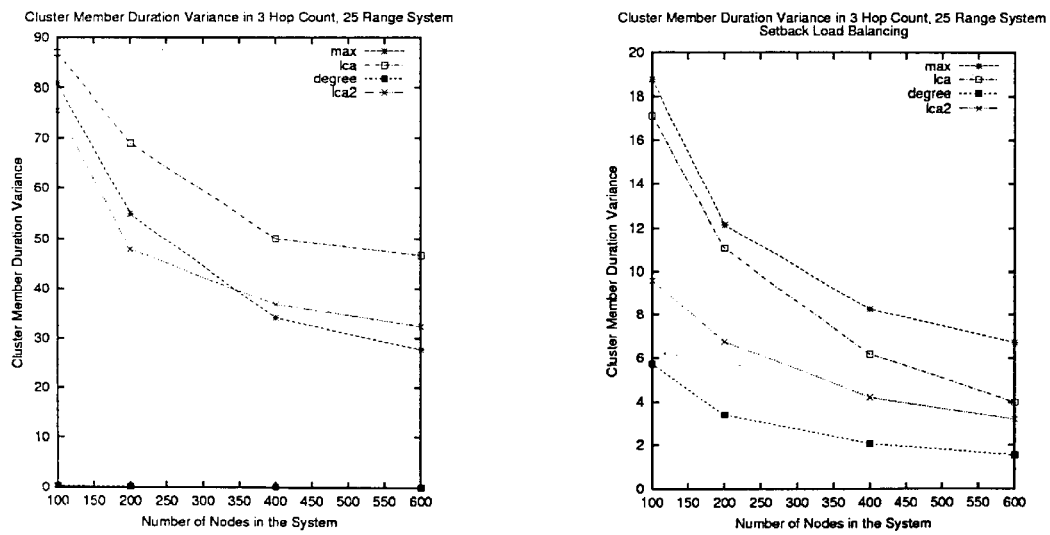
FIG. 21 illustrates impact of network density on cluster member duration variance for networks.

FIG. 21 shows LCA with the highest cluster member duration variance followed by Max-Min, LAC2 and finally Degree. With Load-Balancing applied we see that the cluster member duration variance has decreased for LCA, Max-Min, and LCA2. This decrease in variance is due to the increased clusterhead duration with load-balancing as shown in FIG. 2. Degree's increase in cluster member duration variance is actually a sign of needed stability. Without load-balancing Degree is changing clusterheads about every two seconds (the sampling period), also shown in FIG. 17. Therefore, there is virtually no variance in cluster member duration without load-balancing. As stability is added, we have increased clusterhead duration and variance in the cluster member duration.

For the purposes of these simulations we have set the clusterhead budget to be a function of the maximum amount of work it performs (1000 units of Work). That is, once a clusterhead becomes a clusterhead it will remain a clusterhead until it has exhausted it maximum work load, or until it loses out to another clusterhead based on the rules of the cluster election heuristic. Once a clusterhead does lose its leadership role to another clusterhead its New VID is set to 0 and it becomes a normal node.

Figure 22:
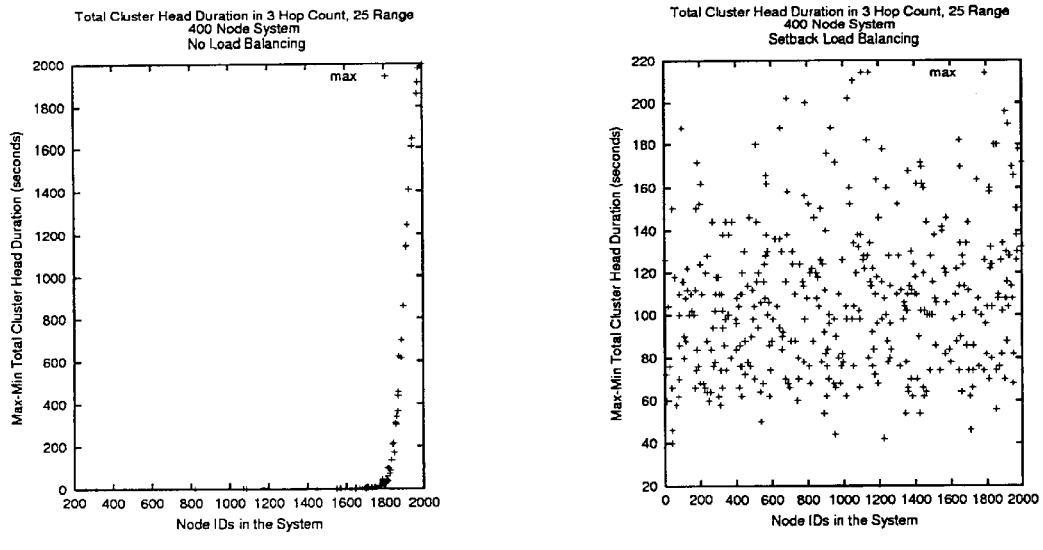
FIG. 22 illustrates scatter graphs with load balancing for the Max-Min heuristic.

FIG. 22 shows a Max-Min scatter graph of the node ids and the associated time each serves as a clusterhead without load-balancing for the entire simulation. It is not surprising that the larger the node id the more time it serves as a clusterhead. Max-Min is based on the larger node ids in the neighborhood becoming the clusterhead. Also shown is the Max-Min scatter graph with load-balancing applied. It is obvious that with load-balancing the clusterhead responsibility is distributed among all of the nodes in the network more evenly. As a result of the distribution the maximum Total Clusterhead Duration is drastically less than that without load-balancing. This will help the nodes with larger node ids last longer as they will not drain their battery power as quick. If the system is properly tuned then all nodes will run out of power roughly at the same time.

Figure 23:
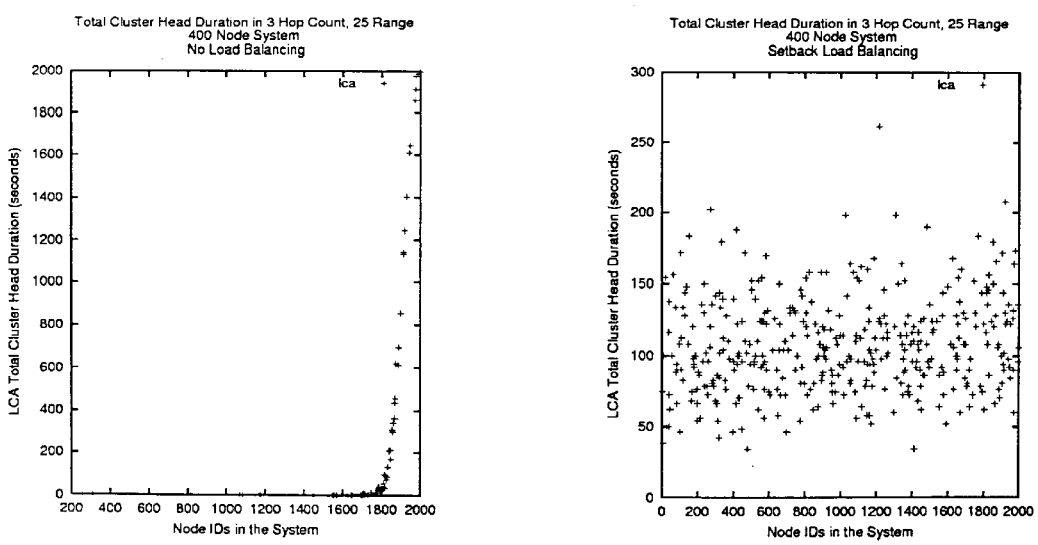
FIG. 23 illustrates scatter graphs with load balancing for the LCA heuristic.

FIG. 23 shows a LCA scatter graph of the node ids and the associated time each serves as a clusterhead without load-balancing for the entire simulation. It is not surprising that LCA produces very similar results as those shown for Max-Min.

Figure 24:
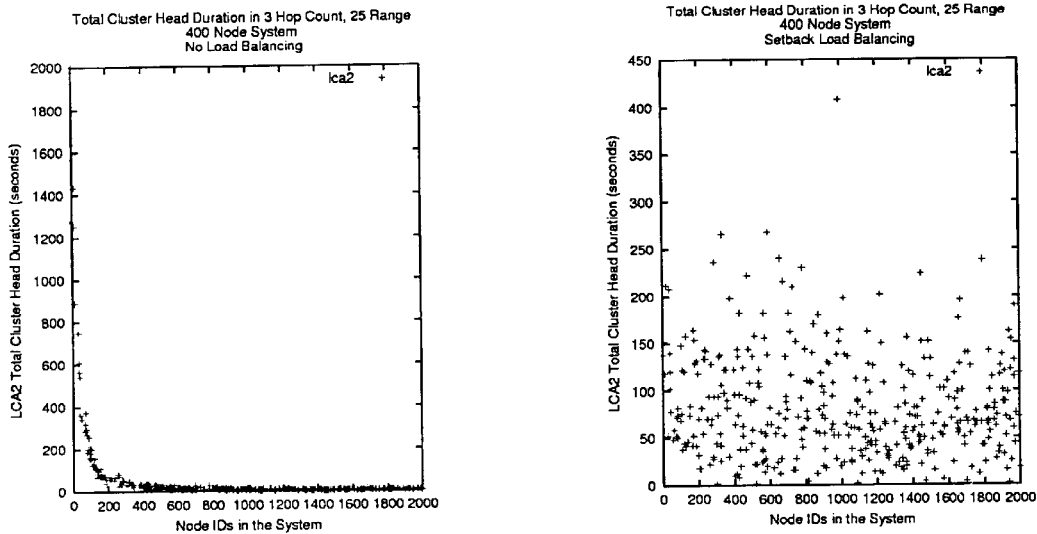
FIG. 24 illustrates scatter graphs with load balancing for the LCA2 heuristic.

FIG. 24 shows a LAC2 scatter graph of the node ids and the associated time each serves as a clusterhead without load-balancing for the entire simulation. It is not surprising that the smaller the node id the more time it serves as a clusterhead. LAC2 is based on the smaller node ids in the neighborhood becoming the clusterhead. Also show is the LAC2 scatter graph with load-balancing applied. Again, with load-balancing the clusterhead responsibility is distributed among all of the nodes in the network more evenly, allowing nodes to deplete their batteries at roughly the same rate.

Figure 25:
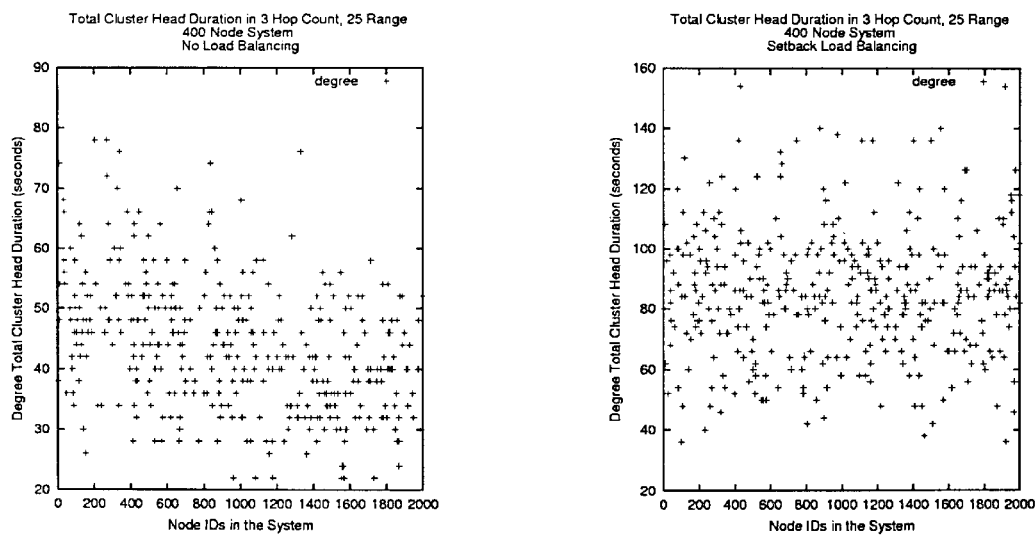
FIG. 25 illustrates scatter graphs with load balancing for the Degree heuristic.

FIG. 25 shows a Degree scatter graph of the node ids and the associated time each serves as a clusterhead without load-balancing for the entire simulation. The Degree heuristic re-elects new clusterheads almost every snapshot. The re-election criteria is degree of connectivity, or the change therein, which is a fairly random event if node movement is random. Therefore, the resultant scatter graph will tend to be distributed even without load-balancing applied. Once we apply load-balancing we see that the results are very similar to those without load-balancing. After close investigation we see that load-balancing extends the maximum and minimum of the Total Clusterhead Duration slightly increasing the stability of the system.

Summary

The proposed Max-Min heuristic is comparable to LCA in terms of cluster size and clusterhead duration, while generating more evenly distributed clusters. Thus, there is no loss of performance. Max-Min also exhibits a higher level of clusterhead stability than LCA2. Thus, there is no loss in performance as far as Max-Min is concerned. This is achieved while significantly increasing the concurrency of communication and reducing the run time from $O(n)$ time slots to $O(d)$ communication rounds, where n is the total number of nodes and d is a constant.

Max-Min runs asynchronously eliminating the need and overhead of highly synchronized clocks. The Max-Min heuristic has generalized the case of 1-hop clusters, found in previous solutions, to d-hop. The input parameter d specifies the maximum distance a node is from its clusterhead, providing control and flexibility in the determination of the clusterhead density. Moreover, the run time for Max-Min is O(d) rounds as compared to O(n) for the previous solutions, providing a very good runtime at the network level. Simple data structures have been used to minimize the local resources at each node. Re-election of clusterheads is promoted via load-balancing heuristic to minimize transferal of databases and to provide controlled stability. Max-Min produces exactly the same results, on average, as that of the LCA heuristics in terms of number of clusterheads, size of clusters, and clusterhead duration. However, Max-Min produces more distributed clusters than LCA as shown by the cluster member size variance between Max-Min and LCA. This allows Max-Min to distribute the load more evenly among the elected clusterheads. LAC2 and Degree based heuristic produce fewer clusterheads, shorter clusterhead duration (lower stability), and larger clusters (short-term load imbalance) than Max-Min, making these heuristics less desirable. Based on these initial simulation results the Max-Min heuristic provides the best all around clusterhead/leader election characteristics.

Many issues are involved in determining the appropriate time to trigger the Max-Min heuristic. If periodic triggers are too closely spaced then the system may run the heuristic even when there has been no noticeable topology change to warrant running the heuristic. If the periodic triggers are too far apart then the topology may change without running the heuristic, causing nodes to be stranded without a clusterhead. The triggering condition should be completely asynchronous and localized to a node's cluster and its neighboring clusters to restrict execution of the heuristic to only affected nodes. Furthermore, the triggering scheme should account for topology changes during the progress of the heuristic.

Applications of the Heuristic

Ad hoc networks are suitable for tactical missions, emergency response operations, electronic classroom networks, etc. As previously mentioned, the clusterheads form a wireless backbone in the network. This backbone provides a channel for clusterheads to communicate topology changes in the network. This allows clusterheads to maintain and update routing information for other nodes in the network. Therefore, when two nodes in different clusters wish to communicate, they will send a message to their clusterhead. The clusterhead can either transmit the message to the destination node, or specify the route for the node to send the message. In either case, the clusterhead has full control of the routing path that the messages traverse. The backbone network may be used for routing of data, but mostly will be used for the dissemination of topology changes. These topology changes are used by the clusterheads to update location management databases. The heuristic runs in good time complexity, O(d) rather than O(n), where n is the number of nodes in the network. Therefore, it is able to construct the individual clusters quickly and independently. This make the heuristic especially well suited for hierarchical routing in ad hoc networks.

Another possible application for this heuristic (max-min heuristic) is to use it in conjunction with Spatial TDMA. Spatial TDMA provides a very efficient communication protocol for clusters with few nodes. However, the nodes must be known and in a fixed location. Hence, Spatial TDMA is not easily usable in ad hoc networks. The proposed heuristic may be used to determine the clusters and the clusterheads in the network. At this point all of the nodes within a cluster are known and assumed to be fixed. This information may be used by Spatial TDMA to construct a TDMA frame for the individual clusters. Spatial TDMA will continue as the communication protocol until there is sufficient topology change that the proposed heuristic is run again to form new clusters.

The previous description is of a preferred embodiment for implementing the invention, and the scope of the invention should not necessarily be limited by this description. The scope of the present invention is instead defined by the following claims.

What is claimed is:

1. A method for selecting a clusterhead not greater than d hops from any node in a cluster within an ad hoc network, wherein d>1, comprising the steps of:

determining at least one largest node identifier for each node within a d-neighborhood of at least one node;

determining at least one smallest node identifier from the at least one largest node identifier;

selecting a clusterhead for the d-neighborhood of at least one node responsive to the determined at least one largest identifier for each node of the d-neighborhood of at least one node and the determined at least one smallest identifier for each node of the d-neighborhood of at least one node; and linking each node of the d-neighborhood of at least one node to the selected clusterhead, wherein the step of selecting the clusterhead further comprises the steps of:

determining the smallest node identifier for a node is not an original node identifier of the node;

identifying all node duplicates for the node;

if node duplicates exist for the node, selecting a node associated with a smallest node duplicate as the clusterhead; and performing the above steps for each node in the d-neighborhood at least one node.

2. The method of claim 1, further comprising the step of linking the selected clusterhead with other clusters of the ad hoc network.

3. The method of claim 1, wherein the step of determining at least one largest node identifier further comprises the steps of:

setting the largest node identifier for each node of the d-neighborhood of at least one node initially equal to an identifier of each node;

receiving a plurality of largest node identifiers from each neighboring node at each node of the d-neighborhood of at least one node; and selecting a largest one of the plurality of largest node identifiers as the largest node identifier at each node of the d-neighborhood of at least one node.

4. The method of claim 1, wherein the step of determining at least one smallest node identifier further comprises the steps of:

setting the smallest node identifier for each node associated with the at least one largest node identifier initially equal to an identifier of each node;

receiving a plurality of smallest node identifiers from each neighboring node at each node associated with the at least one largest node identifier; and selecting a smallest one of the plurality of smallest node identifiers as the smallest node identifier at each node associated with the at least one largest node identifier.

5. The method of claim 1, wherein the step of selecting a clusterhead further comprises the step of selecting a node as its own clusterhead if the smallest node identifier for the node is an original node identifier of the node for each node in the d-neighborhood of at least one node.

6. The method of claim 1, wherein the step of selecting the clusterhead further comprises the steps of:
   determining duplicates do not exist for a node;
   selecting a node associated with the largest node identifier as the clusterhead for the node; and
   performing the above steps for each node in the d-neighborhood of at least one node.

7. The method of claim 1, wherein the step of selecting further comprises the step of transferring a node to a cluster served by a second clusterhead if a pathway between the node and the selected clusterhead passes through another cluster.

8. The method of claim 1, wherein the step of linking further comprises the step of transmitting the selected clusterhead for each node to the selected clusterhead.

9. The method of claim 8, wherein the step of transmitting further comprises the step of transmitting the selected clusterhead from each node to the selected clusterhead occurs from a node furthest away from the selected clusterhead to each neighbor of the node furthest away from the selected clusterhead until reaching the clusterhead.

10. The method of claim 1, wherein the step of selecting is further responsive to a number of contiguous times a node has been a clusterhead.

11. The method of claim 1, wherein the step of selecting is further responsive to an amount of work performed by a clusterhead.

12. The method of claim 1, wherein the d-neighborhood comprises a number of nodes a selected distance from a node.

13. A method for selecting a clusterhead for a cluster of nodes within a packet radio network, comprising the steps of:
   setting a largest node identifier for each node of the cluster of nodes initially equal to an identifier of each node;
   receiving a plurality of largest node identifiers from each neighboring node at each node of the cluster of nodes;
   selecting a largest one of the plurality of largest node identifiers as the largest node identifier at each node of the cluster of nodes;
   setting a smallest node identifier for each node associated with the at least one largest node identifier initially equal to an identifier of each node;
   receiving a plurality of smallest node identifiers from each neighboring node at each node associated with the at least one largest node identifier;
   selecting a smallest one of the plurality of smallest node identifiers as the smallest node identifier at each node associated with the at least one largest node identifier;
   determining if a smallest node identifier for a node equals an original node identifier for the node for each node of the cluster of nodes;
   selecting the node as its own clusterhead if the smallest node identifier for the node equals the original node identifier of the node for each node of the cluster of nodes;
   identifying all node duplicates for the node if the smallest node identifier for the node does not equal the original node identifier of the node for each node of the cluster of nodes;
   if node duplicates exist for the node, selecting a node associated with a smallest node duplicate as the clusterhead for each node of the cluster of nodes;
   if node duplicates do not exist for a node, selecting a node associated with the largest node identifier for the node as the clusterhead for each node of the cluster of nodes;
   transferring the node to a cluster served by a second clusterhead if a pathway between the node and the selected clusterhead passes through another cluster for each node of the plurality of nodes; and
   linking each node of the cluster of nodes to the selected clusterhead.

14. The method of claim 13, wherein the step of linking further comprises the step of transmitting the selected clusterhead for each node of the cluster of nodes to the selected clusterhead.

15. The method of claim 14, wherein the step of transmitting further comprises the step of transmitting the selected clusterhead from each node to the selected clusterhead occurs from a node furthest away from the selected clusterhead to each neighbor of the node furthest away until reaching the clusterhead.

16. The method of claim 13, further including the step of limiting a number of contiguous times a node has been a clusterhead.

17. The method of claim 13, further including the step of selecting a clusterhead responsive to an amount of work performed by a clusterhead.

18. The method of claim 1, wherein the cluster of nodes comprises a number of nodes a selected distance from a node.

19. A communications network comprising:
   a plurality of nodes capable of wirelessly communicating with each other, each of the nodes further comprising:
      a first data array for storing a winning node identifier for selecting a clusterhead;
      a second data array for storing an identity of a node transmitting the winning node identifier to the node; and
      a set of rules for selecting a clusterhead for the node no more that d-hops from any node in a cluster of the node, where d>1, from the winning node identifier in the first data array, wherein the set of rules comprise least the following rules:
      1) if the winning node identifier node identifier is a node identifier of node, the node is the clusterhead for the node, otherwise proceed to Rule 2;
      2) if node duplicates exist for the node, select a second node associated with a node duplicate having a smallest winning node identifier as the clusterhead for the node, otherwise proceed to Rule 3;
      3) selected a third node having a largest winning node identifier as clusterhead for the node;
      4) if a cluster is between the node and the selected clusterhead, the node joins another cluster.

20. The telecommunications network of claim 19, further including control logic configured to perform the steps of:
   determining at least one largest node identifier for each node within a d-neighborhood of at least one node;
   determining at least one smallest node identifier from the at least one largest node identifier;
   selecting a clusterhead for the d-neighborhood of at least one node responsive to the determined at least one largest identifier for each node of the d-neighborhood of at least one node and the determined at least one smallest identifier for each node of the d-neighborhood of at least one node; and
   linking each node of the d-neighborhood of at least one node to the selected clusterhead.

21. The telecommunications network of claim 20, wherein the control logic is further configured to perform the steps of:
  setting the largest node identifier for each node of the d-neighborhood of at least one node initially equal to an identifier of each node;
  receiving a plurality of largest node identifiers from each neighboring node at each node of the d-neighborhood of at least one node; and
  selecting a largest one of the plurality of largest node identifiers as the largest node identifier at each node of the d-neighborhood of at least one node.

22. The telecommunications network of claim 20, wherein the control logic is further configured to perform the steps of:
  setting the smallest node identifier for each node associated with the at least one largest node identifier initially equal to an identifier of each node;
  receiving a plurality of smallest node identifiers from each neighboring node at each node associated with the at least one largest node; and
  selecting a smallest one of the plurality of smallest node identifiers as the smallest node identifier at each node associated with the at least one largest node.

23. The telecommunications network of claim 20, wherein the control logic is further configured to perform the step of selecting a node as its own clusterhead if the smallest node identifier for the node is an original node identifier of the node for each node in the d-neighborhood of at least one node.

24. The telecommunications network of claim 20, wherein the control logic is further configured to perform the steps of:
  determining the smallest node identifier for a node is not an original node identifier of the node;
  identifying all node duplicates for the node;
  if node duplicates exist for the node, selecting a node associated with a smallest node duplicate as the clusterhead; and
  performing the above steps for each node in the d-neighborhood of at least one node.

25. The telecommunications network of claim 20, wherein the control logic is further configured to perform the steps of:
  determining duplicates do not exist for a node;
  selecting the largest node identifier as the clusterhead for the node; and
  performing the above steps for each node in the d-neighborhood of at least one node.

26. The telecommunications network of claim 20, wherein the control logic is further configured to perform the steps of transferring a node to a cluster served by a second clusterhead if a pathway between the node and the selected clusterhead passes through another cluster.

* * * * *